US006892304B1

(12) United States Patent
Galasso et al.

(10) Patent No.: US 6,892,304 B1
(45) Date of Patent: May 10, 2005

(54) SYSTEM AND METHOD FOR SECURELY UTILIZING BASIC INPUT AND OUTPUT SYSTEM (BIOS) SERVICES

(75) Inventors: Leonard J. Galasso, Rancho Santa Margarita, CA (US); Matthew E. Zilmer, Upland, CA (US); Quang Phan, Tustin, CA (US)

(73) Assignee: Phoenix Technologies Ltd., Milpitas, CA (US)

( * ) Notice: Subject to any disclaimer, the term of this patent is extended or adjusted under 35 U.S.C. 154(b) by 613 days.

(21) Appl. No.: 09/679,450

(22) Filed: Oct. 3, 2000

Related U.S. Application Data

(60) Division of application No. 09/336,889, filed on Jun. 18, 1999, now Pat. No. 6,148,387, which is a continuation-in-part of application No. 08/947,990, filed on Oct. 9, 1997, now abandoned.

(51) Int. Cl.[7] .......................... G06F 12/14; G06F 5/177
(52) U.S. Cl. .......................... 713/189; 713/2; 713/179; 709/222
(58) Field of Search ........................ 713/2, 200, 90–99, 713/179; 380/30; 711/202, 206; 709/222, 230, 213

(56) References Cited

U.S. PATENT DOCUMENTS

| | | |
|---|---|---|
| 4,563,737 A | 1/1986 | Nakamura et al. |
| 4,742,447 A | 5/1988 | Duvall et al. |
| 4,868,738 A | 9/1989 | Kish et al. |
| 4,926,322 A | 5/1990 | Stimac et al. |
| 4,928,237 A | 5/1990 | Bealkowski et al. |
| 5,133,058 A | 7/1992 | Jensen |
| 5,193,161 A | 3/1993 | Bealkowski et al. |
| 5,212,633 A | 5/1993 | Franzmeier |
| 5,255,379 A | 10/1993 | Melo |
| 5,265,252 A * | 11/1993 | Rawson et al. ............. 719/326 |
| 5,301,287 A | 4/1994 | Herrell et al. |
| 5,361,340 A | 11/1994 | Kelly et al. |
| 5,388,242 A | 2/1995 | Jewett |
| 5,459,867 A | 10/1995 | Adams et al. |
| 5,459,869 A | 10/1995 | Spilo |
| 5,675,762 A | 10/1997 | Bodin et al. |
| 5,696,970 A | 12/1997 | Sandage et al. |
| 5,758,124 A | 5/1998 | Ogata et al. |
| 5,844,986 A * | 12/1998 | Davis .......................... 713/187 |

OTHER PUBLICATIONS

"Interface Synthesis for Embedded Applications in a CoDesign Environment," BASU et al. IEEE 1997, p. 85–90.

* cited by examiner

Primary Examiner—Justin T. Darrow

(57) ABSTRACT

In accordance with one aspect of the current invention, the system comprises a memory for storing instruction sequences by which the processor-based system is processed, where the memory includes a physical memory and a virtual memory. The system also comprises a processor for executing the stored instruction sequences. The stored instruction sequences include process acts to cause the processor to: map a plurality of predetermined instruction sequences from the physical memory to the virtual memory, determine an offset to one of the plurality of predetermined instruction sequences in the virtual memory, receive an instruction to execute the one of the plurality of predetermined instruction sequences, transfer control to the one of the plurality of predetermined instruction sequences, and process the one of the plurality of predetermined instruction sequences from the virtual memory. In accordance with another aspect of the present invention, the system includes an access driver to generate a service request to utilize BIOS services such that the service request contains a service request signature created using a private key in a cryptographic key pair. The system also includes an interface to verify the service request signature using a public key in the cryptographic key pair to ensure integrity of the service request.

15 Claims, 19 Drawing Sheets

SYSTEM AND METHOD FOR SECURELY UTILIZING BASIC INPUT AND OUTPUT SYSTEM (BIOS) SERVICES

RELATED APPLICATION

This application is a division of Ser. No. 09/336,889 filed Jun. 18, 1999 now U.S. Pat. No. 6,148,387 which is Continuation-In-Part of U.S. patent application Ser. No. 08/947,990 filed on Oct. 9, 1997 now abandoned.

BACKGROUND OF THE INVENTION

1. Field of the Invention

The present invention relates to a system and method for securely utilizing Basic Input and Output System (BIOS) services.

2. Description of the Related Art

In virtual memory subsystems, "virtual" memory addressing is employed in which the memory addresses utilized in software programs are mapped indirectly to locations in physical memory. Translation to physical addresses is typically accomplished by the processor, and such physical addresses are inaccessible to user mode software and the Basic Input/Output System (BIOS).

One example of such virtual memory subsystems is that used by Windows NT, which is manufactured and marketed by Microsoft, Inc. In particular, Windows NT incorporates a demand-paged virtual memory subsystem. The memory address space provided to a program running on the Windows NT operating system is safeguarded from other user mode programs just as other programs are protected from it. This ensures that user mode services and applications will not write over each other's memory, or execute each other's instructions. Kernel mode services and applications are protected in a similar way. If an attempt to access memory outside of a program's allocated virtual space occurs, the program is terminated and the user is notified. Virtual memory subsystems also prevent direct access by user mode software to physical memory addresses and to input/output devices that are part of a computer system.

There is an increasing trend towards the use of input/output devices on a computer system which are capable of executing operating systems using virtual memory subsystems. In such systems, there is no means for accessing memory outside of a program's virtual memory space, such as BIOS functions. One approach to this problem is to install a device driver which reads a file containing instructions for a device. The driver reads the file and writes (or downloads) these instructions into the device's memory. However, this type of device driver permits only limited addressing capability for memory and input/output operations. In addition, it does not allow execution of the system's processor instructions in physical memory space.

Accordingly, there is a need in the technology for a system and method for accessing and executing the contents of physical memory from a virtual memory subsystem, which facilitates increased addressing capability for memory and input/output operations, and which also allows execution of processor instructions directly from physical memory.

Furthermore, data stored on computer systems or platforms can be updated or configured. In certain cases, the data is extremely sensitive. A good example of configurable sensitive data is the Basic Input and Output System (BIOS) of a computer system. Typically stored in some form of non-volatile memory, the BIOS is machine code, usually part of an Operating System (OS), which allows the Central Processing Unit (CPU) to perform tasks such as initialization, diagnostics, loading the operating system kernel from mass storage, and routine input/output ("I/O") functions. Upon power up, the CPU will "boot up" by fetching the instruction code residing in the BIOS. Without any security protection, the BIOS is vulnerable to attacks through capturing and replaying of service requests to invoke functions provided by the BIOS. These attacks may corrupt the BIOS and disable the computer system.

Accordingly, there is also need to provide a system and method to verify the integrity of service requests to access or modify data in the BIOS and to enforce proper authorization limits of those remote request messages.

SUMMARY OF THE INVENTION

The present invention provides a system and method for securely utilizing Basic Input and Output System (BIOS) services.

In accordance with one aspect of the current invention, the system comprises a memory for storing instruction sequences by which the processor-based system is processed, where the memory includes a physical memory and a virtual memory. The system also comprises a processor for executing the stored instruction sequences. The stored instruction sequences include process acts to cause the processor to: map a plurality of predetermined instruction sequences from the physical memory to the virtual memory, determine an offset to one of the plurality of predetermined instruction sequences in the virtual memory, receive an instruction to execute the one of the plurality of predetermined instruction sequences, transfer control to the one of the plurality of predetermined instruction sequences, and process the one of the plurality of predetermined instruction sequences from the virtual memory.

Another aspect of the system includes an access driver to generate a service request to utilize BIOS services such that the service request contains a service request signature created using a private key in a cryptographic key pair. The system also includes an interface to verify the service request signature using a public key in the cryptographic key pair to ensure integrity of the service request.

DETAILED DESCRIPTION OF THE PREFERRED INVENTION

Definitions

As discussed herein, a "computer system" is a product including circuitry capable of processing data. The computer system may include, but is not limited to, general purpose computer systems (e.g., server, laptop, desktop, palmtop, personal electronic devices, etc.), personal computers (PCs), hard copy equipment (e.g., printer, plotter, fax machine, etc.), banking equipment (e.g., an automated teller machine), and the like. An infomediary is a web site that provides information on behalf of producers of goods and services, supplying relevant information to businesses about products and/or services offered by suppliers and other businesses. Content refers to application programs, driver programs, utility programs, the payload, etc., and combinations thereof, as well as graphics, informational material (such as articles, stock quotes, etc.) and the like, either singly or in any combination. In addition, a "communication link" refers to the medium or channel of communication. The communication link may include, but is not limited to, a telephone line, a modem connection, an Internet connection, an Integrated Services Digital Network ("ISDN") connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof. Power On Self Test (POST) refers to the instructions that are executed to configure and test the system hardware prior to loading an OS.

System Overview

A description of an exemplary system, which incorporates embodiments of the present invention, is hereinafter described.

Figure 1:
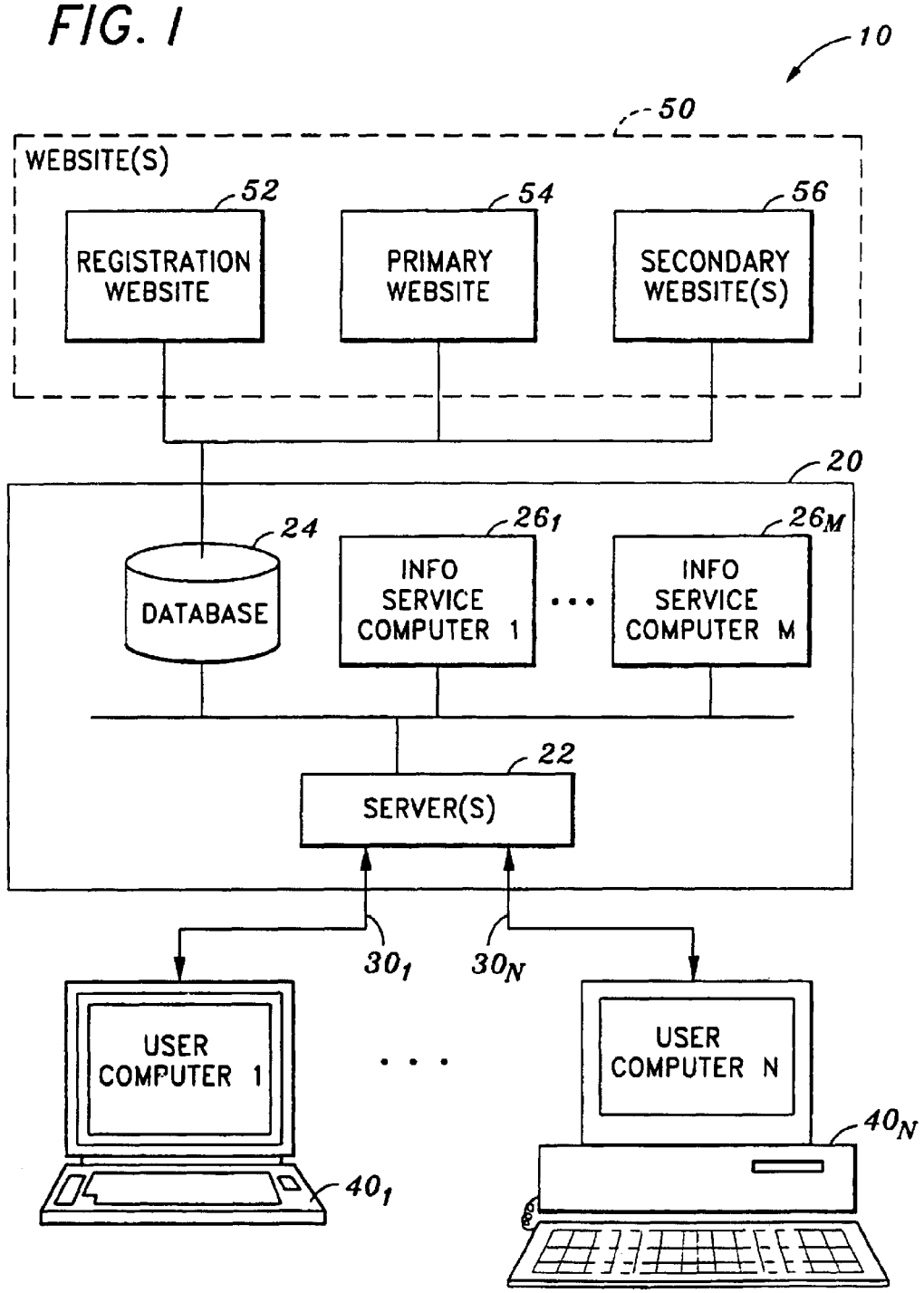
FIG. 1 is a system block diagram of one embodiment of an information distribution system in which the and method of the invention is used.

FIG. 1 shows a system block diagram of one embodiment of an information distribution system 10 in which the system and method of the invention is used. The system 10 relates to providing an infomediary. It involves the construction and maintenance of a secure and private repository of Internet user and system profiles, collected primarily from warranty service registrations, Internet service registrations, system profiles, and user preferences. Initially, this information is used to register the user with the manufacturers of purchased hardware and software products, and with the providers of on-line or other services. Over time, the user data is used to create a user profile and notify users of relevant software updates and upgrades, to encourage on-line purchases of related products, and to enable one-to-one customized marketing and other services.

In one embodiment, two software modules are used to implement various embodiments of the invention. One is resident on a user's system, and is used to access a predetermined web site. For example, in one embodiment, the operating system and Basic Input and Output System (BIOS) are pre-installed on a computer system, and when the computer system is subsequently first powered up, an application, referred to for discussion purposes as the first software module (in one embodiment, the first software module is the initial start-up application (ISUA), which will be described in the following sections), will allow the launching of one or more executable programs in the pre-boot environment. In one embodiment, the first software module facilitates the launching of one or more executable programs prior to the loading, booting, execution and/or running of the OS. In one embodiment, the user is encouraged to select the use of such a program (i.e., the use of the first software module), and in alternative embodiments, the program is automatically launched. The program(s) contained in the first software module enables tools and utilities to run at an appropriate time, and with proper user authorization, also allow the user to download a second software module that includes drivers, applications and additional payloads through the Internet connection on the PC. The programs may also provide for remote management of the system if the OS fails to launch successfully.

Once the second software module has been delivered, it may become memory resident, and may disable the transferred copy of the first software module. The original copy of the first software module still residing in the system's non-volatile memory remains idle until the second software module fails to function, becomes corrupted or is deleted, upon which a copy of the original first software module is again transferred as described above. The second software module may include an application that connects the user to a specific server on the Internet and directs the user to a predetermined web site to seek authorization to down load further subscription material. The second software module may also include content that is the same or similar to the content of the first software module.

In one embodiment, the system may also include an initial payload that is stored in Read Only Memory BIOS (ROM BIOS). In one embodiment, the initial payload is part of the first software module (e.g., the ISUA). In an alternative embodiment, the initial payload is stored as a module in ROM BIOS, separate from the first software module. In one embodiment, the initial payload is launched from ROM BIOS and displayed on the screen after the Power On Self Test (POST) but prior to the booting, loading and/or execution of the OS. This may occur at a predetermined time, such as when the system is being manufactured, assembled and tested, or when the end user first activates the system. In an alternate embodiment, this initial payload is copied to a predetermined location (such as the system's hard disk) at a predetermined time, such as when the system is being manufactured, assembled and tested, or when the end user first activates the system.

Once copied, the payload executes after POST but prior to operation of the OS, and may display graphics, advertisements, animation, Joint Photographic Experts Group (JPEG)/Moving Picture Experts Group (MPEG) formatted material on the screen. When additional programs and/or payloads are delivered (via the Internet or other outside connection), the display screen may be used to provide customized screens in the form of messages or graphics prior to and during booting of the OS. In addition, executable programs delivered in the first software module, as well as subsequent programs (such as the second software module) downloaded from the web site, may be used to survey the PC to determine various types of devices, drivers, and applications installed. In one embodiment, as described in co-pending U.S. patent application Ser. No. 09/336,289, entitled "Method and Apparatus for Automatically Installing And Configuring Software on a Computer", filed Jun. 18, 1999, assigned to Phoenix Technologies Ltd., the contents of which are incorporated herein by reference, the first software module is used to identify and to automatically create shortcuts and/or bookmarks for the user. The programs downloaded from the website may include software that collects and maintains a user profile based on the user's preferences. Such information may be provided to the infomediary, which subsequently forwards portions of the information and/or compiled data based on the information to suppliers and other businesses to obtain updates or revisions of information provided by the suppliers and other businesses.

Referring to FIG. 1, the information distribution system 10 comprises a service center 20 that is connected over one or more communications links $30_1$–$30_N$ to one or more user computer systems $40_1$–$40_N$ ("40"). The service center 20 includes one or more servers 22, one or more databases 24, and one or more computers $26_1$–$26_M$. The one or more computers $26_1$–$26_M$ are capable of simultaneous access by a plurality of the user computer systems $40_1$–$40_N$. If a plurality of computers are used, then the computers $26_1$–$26_M$ may be connected by a local area network (LAN) or any other similar connection technology. However, it is also possible for the service center 20 to have other configurations. For example, a smaller number of larger computers (i.e. a few mainframe, mini, etc. computers) with a number of internal programs or processes running on the larger computers capable of establishing communications links to the user computers.

The service center 20 may also be connected to a remote network 50 (e.g., the Internet) or a remote site (e.g., a satellite, which is not shown in FIG. 1). The remote network 50 or remote site allows the service center 20 to provide a wider variety of computer software, content, etc. that could be stored at the service center 20. The one or more databases 24 connected to the service center computer(s), e.g., computer $26_1$, are used to store database entries consisting of computer software available on the computer(s) 26. In one embodiment, each user computer $40_1$–$40_N$ has its own secure database (not shown), that is not accessible by any other computer. The communication links $30_1$–$30_N$ allow the one or more user computer systems $40_1$–$40_N$ to simultaneously connect to the computer(s) $26_1$–$26_M$. The connections are managed by the server 22.

After a user computer system 40 establishes two-way communications with the information service computer 26, the content is sent to the user computer system 40 in a manner hereinafter described. The downloaded content includes an application that surveys the user and/or the user computer system's hardware and/or software to develop a user profile as well as a profile of the user's system. The information gathered from the user and/or user's computer system is subsequently provided to the service center 20, which provides additional content to the user computer 40 based on the user and system profile. The database entries from the database connected to the service computer 26 contain information about computer software, hardware, and third party services and products that are available to a user. Based on the user and/or system profile, the content is further sent to the user computer for display. The content may also include a summary of information such as the availability of patches and fixes for existing computer software, new versions of existing computer software, brand new computer software, new help files, etc. The content may further include information regarding availability of hardware and third party products and services that is of interest to the user. The user is then able to make one or more choices from the summary of available products and services, and request that the products be transferred from the service computer 26 to the user computer. Alternatively, the user may purchase the desired product or service from the summary of available products and services.

Figure 2:
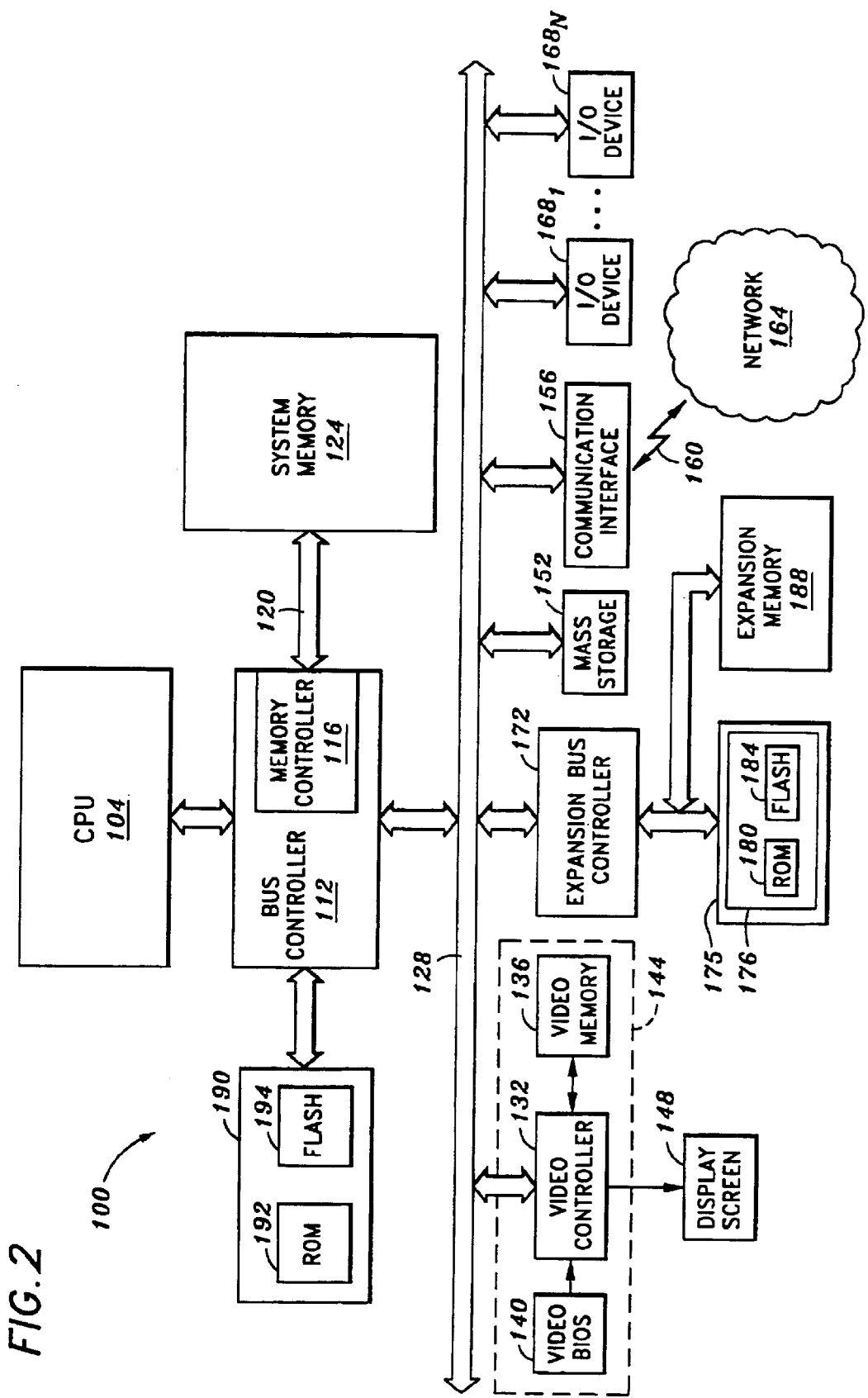
FIG. 2 illustrates an exemplary processor system or user computer system which implements embodiments of the present invention.

FIG. 2 illustrates an exemplary computer system 100 that implements embodiments of the present invention. The computer system 100 illustrates one embodiment of user computer systems $40_1$–$40_N$ and/or computers $26_1$–$26_M$ (FIG. 1), although other embodiments may be readily used.

Referring to FIG. 2, the computer system 100 comprises a processor or a central processing unit (CPU) 104. The illustrated CPU 104 includes an Arithmetic Logic Unit (ALU) for performing computations, a collection of registers for temporary storage of data and instructions, and a control unit for controlling operation for the system 100. In one embodiment, the CPU 104 includes any one of the x86, Pentium™, Pentium II™, and Pentium Pro™ microprocessors as marketed by Intel™ Corporation, the K-6 microprocessor as marketed by AMD™, or the 6x86MX microprocessor as marketed by Cyrix™ Corp. Further examples include the Alpha™ processor as marketed by Digital Equipment Corporation™, the 680x0 processor as marketed by Motorola™; or the Power PC™ processor as marketed by IBM™. In addition, any of a variety of other processors, including those from Sun Microsystems, MIPS, IBM, Motorola, NEC, Cyrix, AMD, Nexgen and others may be used for implementing CPU 104. The CPU 104 is not limited to microprocessor but may take on other forms such as microcontrollers, digital signal processors, reduced instruction set computers (RISC), application specific integrated circuits, and the like. Although shown with one CPU 104, computer system 100 may alternatively include multiple processing units.

The CPU 104 is coupled to a bus controller 112 by way of a CPU bus 108. The bus controller 112 includes a memory controller 116 integrated therein, though the memory controller 116 may be external to the bus controller 112. By the memory controller 116 provides an interface for access by the CPU 104 or other devices to system memory 124 via memory bus 120. In one embodiment, the system memory 124 includes synchronous dynamic random access memory (SDRAM). System memory 124 may optionally include any additional or alternative high speed memory device or memory circuitry. The bus controller 112 is coupled to a system bus 128 that may be a peripheral component interconnect (PCI) bus, Industry Standard Architecture (ISA) bus, etc. Coupled to the system bus 128 are a graphics controller, a graphics engine or a video controller 132, a mass storage device 152, a communication interface device 156, one or more input/output (I/O) devices $168_1$–$168_N$, and an expansion bus controller 172. The video controller 132 is coupled to a video memory 136 (e.g., 8 Megabytes) and video BIOS 140, all of which may be integrated onto a single card or devices as designated by numeral 144. The video memory 136 is used to contain display data for displaying information on the display screen 148, and the video BIOS 140 includes code and video services for controlling the video controller 132. In another embodiment, the video controller 132 is coupled to the CPU 104 through an Advanced Graphics Port (AGP) bus.

The mass storage device 152 includes (but is not limited to) a hard disk, floppy disk, CD-ROM, DVD-ROM, tape, high density floppy, high capacity removable media, low capacity removable media, solid state memory device, etc., and combinations thereof. The mass storage device 152 may include any other mass storage medium. The communication interface device 156 includes a network card, a modem interface, etc. for accessing network 164 via communications link 160. The I/O devices $168_1$–$168_N$ include a keyboard, mouse, audio/sound card, printer, and the like. The I/O devices $168_1$–$168_N$ may be a disk drive, such as a compact disk drive, a digital disk drive, a tape drive, a zip drive, a jazz drive, a digital video disk (DVD) drive, a solid state memory device, a magneto-optical disk drive, a high density floppy drive, a high capacity removable media drive, a low capacity media device, and/or any combination thereof. The expansion bus controller 172 is coupled to nonvolatile memory 175 which includes system firmware 176. The system firmware 176 includes system BIOS 82, which is for controlling, among other things, hardware devices in the computer system 100. The system firmware 176 also includes ROM 180 and flash (or EEPROM) 184. The expansion bus controller 172 is also coupled to expansion memory 188 having RAM, ROM, and/or flash memory (not shown). The system 100 may additionally include a memory module 190 that is coupled to the bus controller 112. In one embodiment, the memory module 190 comprises a ROM 192 and flash (or EEPROM) 194.

As is familiar to those skilled in the art, the computer system 100 further includes an operating system (OS) and at least one application program, which in one embodiment, are loaded into system memory 124 from mass storage device 152 and launched after POST. The OS may include any type of OS including, but not limited or restricted to, DOS, Windows™ (e.g., Windows 95™, Windows 98™, Windows NT™), Unix, Linux, OS/2, OS/9, Xenix, etc. The operating system is a set of one or more programs which control the computer system's operation and the allocation of resources. The application program is a set of one or more software programs that performs a task desired by the user.

In accordance with the practices of persons skilled in the art of computer programming, the present invention is described below with reference to symbolic representations of operations that are performed by computer system 100, unless indicated otherwise. Such operations are sometimes referred to as being computer-executed. It will be appreciated that operations that are symbolically represented include the manipulation by CPU 104 of electrical signals representing data bits and the maintenance of data bits at memory locations in system memory 124, as well as other processing of signals. The memory locations where data bits are maintained are physical locations that have particular electrical, magnetic, optical, or organic properties corresponding to the data bits.

When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 3:
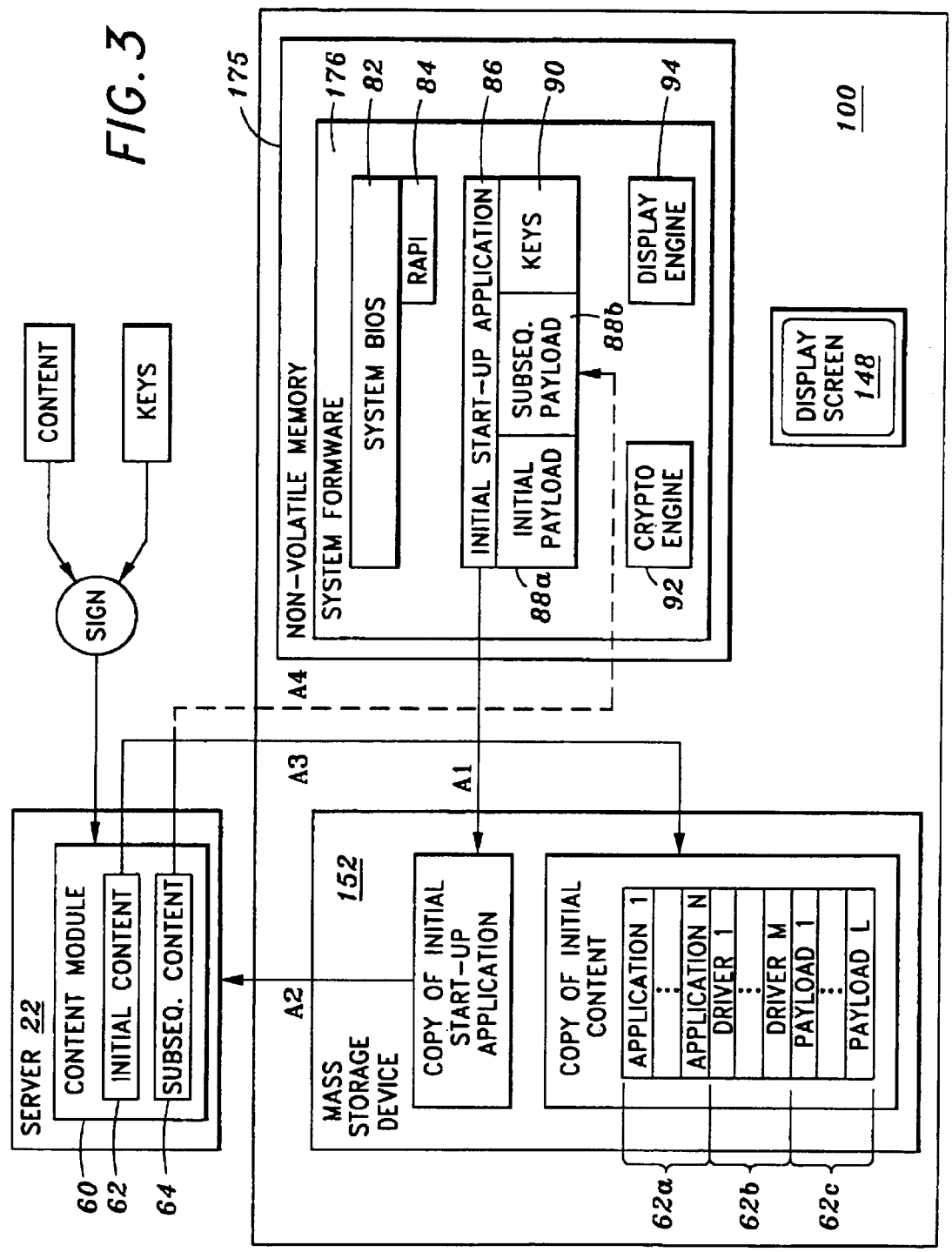
FIG. 3 illustrates a diagram of one embodiment of the computer system of FIG. 2, in which the system and method of invention is used.

FIG. 3 illustrates a logical diagram of computer system 100. Referring to FIGS. 2 and 3, the system firmware 176 includes software modules and data that are loaded into system memory 124 during POST and subsequently executed by the processor 104. In one embodiment, the system firmware 176 includes a system BIOS module 82 having system BIOS handlers, hardware routines, etc., a ROM application program interface (RAPI) module 84, an initial start-up application (ISUA) module 86, an initial payload 88a, cryptographic keys 90, a cryptographic engine 92, and a display engine 94. The aforementioned modules and portions of system firmware 176 may be contained in ROM 180 and/or flash 184. Alternatively, the aforementioned modules and portions of system firmware 176 may be contained in ROM 190 and/or flash 194. The RAPI 84, ISUA 86, and initial payload 88a may each be separately developed and stored in the system firmware 176 prior to initial use of the computer system 100. In one embodiment, the RAPI 84, ISUA 86, and initial payload 88a each includes proprietary software developed by Phoenix Technologies, Ltd.

RAPI 84 generally provides a secured interface between ROM application programs and system BIOS 82. One embodiment of RAPI 84 is described below in FIGS. 8 through 18 and the accompanying text. One embodiment of ISUA 86 is described in co-pending U.S. patent application Ser. No. 09/336,289, entitled "Method and Apparatus for Automatically Installing and Configuring Software on a Computer," filed on Jun. 18, 1999, assigned to Phoenix Technologies, Ltd., and which is incorporated herein by reference.

Accessing and Executing Contents of Physical Memory From Virtual Memory

Figure 4:
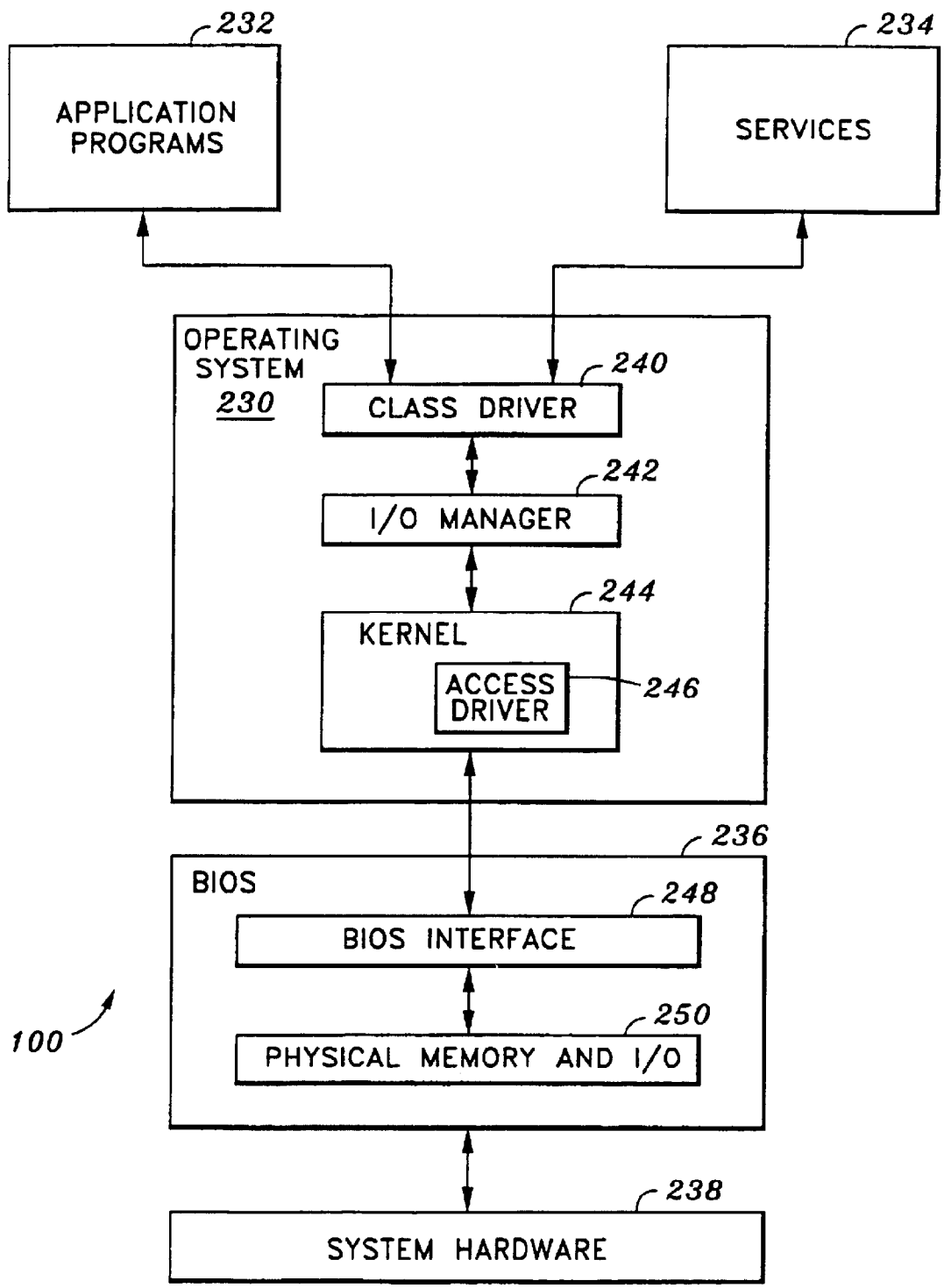
FIG. 4 is an overall functional block diagram illustrating the architecture of an operating system which utilizes the system and method of the present invention.

One aspect of the present invention is described with reference to an operating system installed on the processing system 100, shown in FIG. 2. FIG. 4 is an overall functional block diagram illustrating the architecture of a processing system utilizing the system and method of the present invention. The processing system 100 comprises an operating system 230 which supports application programs 232 and services 234, Basic Input/Output System ("BIOS") 236 and system hardware 238. The BIOS 236 is a collection of drivers, or software interfaces for hardware devices such as the console (keyboard and display), a generic printer, the auxiliary device (serial port), the computer's clock and the boot disk device. The BIOS 236 is typically embedded in programmable, read only memory (ROM). Often, the BIOS functions themselves are actually copied from ROM into physical memory, taking advantage of the faster access times of physical memory. This is known as "shadowing" the BIOS 236 because two copies of BIOS 236 results: one in ROM (which will no longer be used) and the other in physical memory. The portion of physical memory which stores the BIOS 236 is known as the BIOS shadow space. An operating system such as Windows NT makes no use of the BIOS 236 after the operating system has been booted and is running. The kernel level drivers in the Windows NT operating system interface directly with the system hardware. The present invention facilitates the use of the BIOS 236 as an interface between system hardware 238 and an operating system 230.

The operating system 230 includes a class driver 240 which interfaces with the application programs 232 and services 234, and an I/O Manager 242. The I/O Manager 242 converts I/O requests from the application programs 232 and services 234 (made via the class driver 240) into properly sequenced calls to various driver routines located in the kernel 244. In particular, when the I/O Manager 242 receives an I/O request, it uses the function codes of the request to call one of several dispatch routines in a driver located in the kernel 244. The kernel 244 provides hardware-independent functions, called system functions, that are accessed by means of a software interrupt. The functions provided by the kernel 244 include file and directory management, memory management, character device input/output and time and date support, among others. In one embodiment, the operating system is the Windows NT operating system. In alternate embodiments, the operating system 230 includes the Solaris or the AIX operating systems or other operating systems based on demand-paged virtual memory subsystems.

The present invention provides an access driver 246, located within the kernel 244, which is responsible for accessing BIOS data located in the BIOS 236 or for accessing system hardware 238 data via the BIOS 236. The access driver 246 is also responsible for accessing the location of a BIOS function address, as well as executing the associated BIOS function. In one preferred embodiment, the access driver 246 comprises source code written in the C language. It is understood that other assembly languages may be utilized in implementing the functions of the access driver 246. The BIOS data and addresses are typically located in physical memory 250 and are accessed by the access driver 246 via a BIOS Interface 248. In one embodiment, the access driver 246 executes code in the BIOS shadow space, typically at physical addresses 0x000E0000 through 0x000FFFFF.

By way of example, if the access driver 246 needs to access BIOS functions located in physical memory at address 0x00000000. It makes a call to the I/O Manager 242, requesting it to map the memory space at physical address 0x00000000 through 0x00000FFF to its virtual memory space. The I/O Manager 242 then returns a pointer to the virtual memory space of the access driver 246, for example, 0xfd268000. The access driver may now reference the address space at physical address 0x00000000 by basing or referring its virtual addresses with 0xfd268000. Thus, to access a function located at physical address 0x2400, the virtual address used would be 0xfd2682400.

In one preferred embodiment, a set of entry-points or function calls are available to the application programs 232, services 234 or class driver 240 which utilize the access driver 246. The access driver 246 can be opened, closed, and can receive input/output ("I/O") control codes ("IOCTLs") through these entry points. Table 1 illustrates the structure, entry points and applications for the access driver 246.

Figure 5:
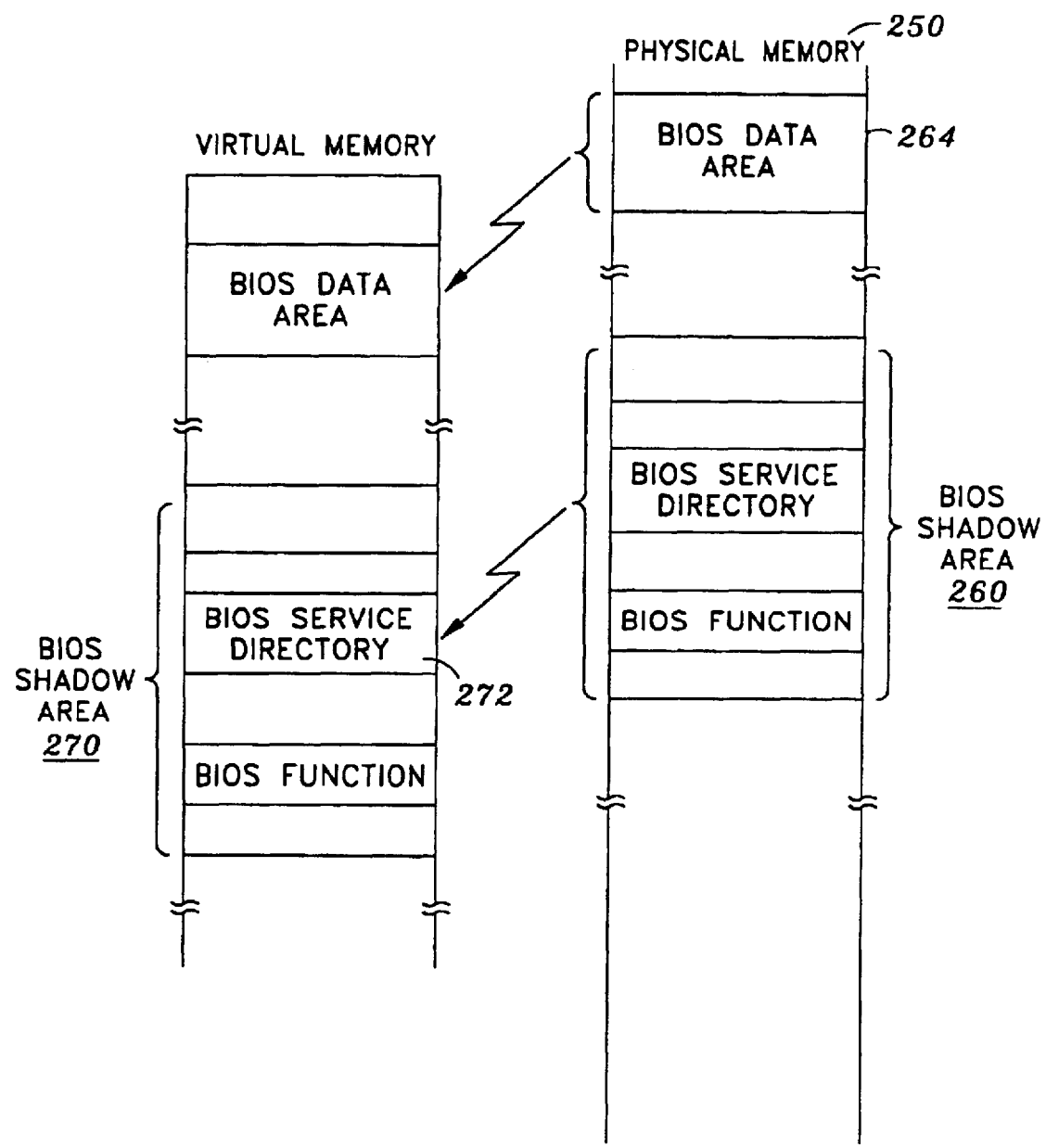
FIG. 5 is a block diagram illustrating the access driver 46 initialization process as provided in accordance with the principles of the present invention.

FIG. 5 is a block diagram illustrating the access driver 246 initialization process as provided in accordance with the principles of the present invention. In general, when the access driver 246 is first loaded, its DriverEntry function (see Table 1) is executed. Although a number of other initializations occur in this function (such as the allocation of various resources or objects for normal operation of the access driver 246), two particularly essential initializations occur: (a) the BIOS shadow area 260 (which includes a BIOS Service Directory 62) located in physical memory 250 and (b) the BIOS data area 264, also located in physical memory 250, are both mapped into the virtual memory (shown in FIG. 5 as the BIOS shadow area 270 (which includes the BIOS Service Directory 272 and the BIOS data area 74) of the access driver 246. As a result, application programs 232 or services 2234 may, through the class driver 240, access or execute BIOS functions using virtual addressing. It should be noted that execution of the BIOS function must occur from the access driver 246 because the physical address space of the BIOS 236 is mapped only to the access driver 246. In addition, the access driver 246 may be utilized through the implementation of a 32-bit BIOS Power Management Service Interface as described in detail in Appendix A. It is apparent to one skilled in the art that the BIOS Power Management Service Interface may also be implemented for 64-bit, 128-bit and 256-bit configurations. The access driver 246 can also operate in 64-bit, 128-bit and 256-bit configurations.

In particular, the access driver 246, during initialization, locates the BIOS shadow area 260 and the BIOS data area 264 located in physical memory 250. The BIOS shadow area 260 and the BIOS data area 264 are mapped into the virtual address space of the access driver 246. Next, the access driver 246 performs a search for the BIOS Service Directory 272 header. Upon finding and validating the BIOS Service Directory 272, the access driver 246 obtains the virtual address of the BIOS Service Directory 272 header, which provides the offset of the BIOS Service Directory 272 header virtual address from the base virtual address of the BIOS shadow area 270.

In an alternate embodiment, the access driver, during initialization, locates the BIOS shadow area 260, the BIOS data area 264 and the BIOS ROM area located in physical memory 250. The BIOS shadow area 260, the BIOS data area 264 and the BIOS ROM area are mapped into the virtual address space of the access driver 246. Next, the access driver 246 performs a search for the BIOS Service Directory 272 header. Upon finding and validating the BIOS Service Directory 272, the access driver 246 obtains the virtual address of the BIOS Service Directory 272 header. In this alternate embodiment, the availability of the BIOS ROM area in the virtual memory space of the access driver 246 enables the access driver 246 to read and/or write data in flash ROM. As a result, the BIOS ROM can be reflashed or rewritten. In addition, outside application programs which interface with hardware can access the BIOS ROM area through software mechanisms such as that described in the PhoenixPhlash NT specification provided in Appendix B.

Later, calls to an execution function in the access driver 246 will utilize the base virtual address of the BIOS shadow area 270 and the offset to invoke a requested entry point in the BIOS itself. It should be noted that an application program 232 or service 234 may cause execution of the BIOS function anywhere in the BIOS' virtual address space, and not only through the BIOS Service Directory 272.

In one embodiment, the execution function that is called to invoke a requested entry point in the BIOS is the IOCTL_BIOS_EXEC function, which is described in Table 1. The IOCTL_BIOS_EXEC function creates a register stack in a buffer (which is specified by the calling application program 232 or service 234) located in main memory or DRAM. The contents of the stack are the desired register values at the time the BIOS function is invoked. The access driver 246 passes the register stack from the calling application program 232 or service 234. The procedure call itself is performed using a pointer to the function specified in the BIOS Service Directory 272. In one embodiment, the BIOS function called by IOCTL_BIOS_EXEC accepts a 4-byte signature as an argument and locates the BIOS function associated with the signature. Values passed back to the calling application program 232 or service 234 include the base virtual address of the BIOS function, and the offset from the base address of the service's entry point.

A general discussion of the structure, entry functions and applications for access driver 246 will now be provided.

TABLE 1

Access Driver 246 Functions

| Function Name | Description | Remarks |
| --- | --- | --- |
| DriverEntry | Kernel calls this function at load time to cause the driver to initialize itself. | |
| Access Driver CreateClose | Kernel calls this function to create or close out the driver's functionality. | |
| Access Driver Unload | Called by Kernel for Service Control Manager to unload the driver. This function frees all resources established at load time. | |
| IOCTL_Locate | Locates the BIOS 232-bit entry point using a string search. The entry point virtual address, the BIOS base virtual address and the BIOS data area virtual address are returned to the caller. | |
| IOCTL_BIOS_Read | Reads data from either the BIOS ROM, shadow or BIOS data area and returns it to the user's buffer. | |
| IOCTL_BIOS_Write | Writes data to either the BIOS ROM, shadow or BIOS data area from the user's buffer. | |
| IOCTL_BIOS_Exec | Passes execution to a BIOS entry point via the 232-bit entry point | |
| IOCTL_RTC_Read | Reads the real-time clock date and time and returns these to the calling function. | Format of returned data will match SYSTEMTIME template. |

TABLE 1-continued

Access Driver 246 Functions

| Function Name | Description | Remarks |
| --- | --- | --- |
| IOCTL_Version | Returns the version number of the driver to the caller | Includes a bitmap of currently implemented functions |
| Access Driver DriverReg | Registers the calling device by its object name and canonical name. | The list of registered devices will be used to resume and suspend. |
| Access Driver DriverReg | Deregisters the calling device. | The device must have registered already. |
| IOCTL_PM_Suspend | The function sends Suspend IRP's to all registered devices. | |
| IOCTL_PM_Resume | The function sends Resume IRP's to all registered devices. | |

A. Detailed description of the Access Driver 246 functions

1. The "DriverEntry" function

This entry point causes the driver to initialize its variables, map in the BIOS shadow and data areas, and to allocate resources for its normal operation. As each resource or object is allocated, it is tabulated into the variable 'phResAndFlags'; this allows a single function ('freeResources') to free up resources used by the driver, no matter the reason for the driver being unloaded. The resources allocated or connected to are as follows:

a. Create the Device Object—establishes a device object and name with the system.

b. Initialize Error Logging—creates a link to the Event Log services.

c. Set up the major function entry points.

d. Create a Symbolic link—for use by Service or Application layers.

e. Map in the BIOS shadow—makes this memory space accessible in virtual memory to the driver.

f. Map in the BIOS ROM—makes the ROM area accessible in virtual memory address space.

g. Map in the BIOS Data—makes this memory space accessible in virtual memory to the driver.

h. Locate the BIOS 232-bit entry point for use by this driver.

In one embodiment, the device object name is 'Laptop', which is required in order to service the nexus functions required by the Microsoft OEM Adaptation Kit (OAK). The corresponding symbolic link name is 'PhoenixAD'.

2. AccessDriverCreateClose

This function is used to inform the driver 246 when an application program 232 or service 234 makes a request to the system for a device handle, or when it closes a handle already obtained. The Access Driver 246 responds to this dispatch entry point by completing the request successfully, but changing no other state variable of the driver 246.

3. AccessDriverUnload

This dispatch entry point is called by the kernel on behalf of the Service Control Manager (SCM) or other application when it is necessary to remove the driver from the system (device close from (SCM)). The result of this function call is that all resources tabulated in 'phResAndFlags' are freed to the system and the request is completed successfully.

4. AccessDriverReg

The Access Driver 246 driver has the function of performing "nexus processing" for the power management model provided as part of the OEM Adaptation Kit (OAK). This function is integral to the emulation of power management for OEM and standard devices having knowledge of and a requirement to use the OAK control methods. The AccessDriverReg function registers devices into a linked list. It also selectively "deregisters" devices on request. Typically OAK compliant device drivers will make the call for registration when their DriverEntry function is executed (when they are first loaded). And as part of the DriverUnload function, each registered device must make the call to remove itself from Access Driver 246's linked list of devices needing power management services.

5. IOCTL Functions

Every interface between the service or application layer and the BIOS is handled by an IOCTL function in the Access Driver 246 driver. Each IOCTL transfer is performed in Buffered Mode, so that the input data to the driver and its output data are transferred through a common system buffer. The pointer to this buffer space is given in the Input/Output (I/O) Request Packet as Irp>AssociatedIrp.SystemBuffer. Upon being given control, the IOCTL (within the driver) will get the system buffer address and use its contents to perform the request. The results of the IOCTL function's execution will be placed in the same system buffer as was used for input.

Each IOCTL that is implemented in the Access Driver 246 driver has a unique data format for IOCTL input data and for its output data. As the functions are described below, their data buffer formats and descriptions of each field are given. Buffer offsets are given in bytes. The minimum buffer size given for each function is a recommended malloc( ) size to use for the application program's user buffers. System buffer sizes will automatically be derived from the user buffers.

6. IOCTL Locate

The IOCTL_Locate function is the first dispatch entry point to be called by the application program 232 or service 234 after the driver 246 initializes. The function returns the addresses of the BIOS232 Service Interface, the base address of the BIOS shadow area, and the base address of the BIOS Data Area, in flat-model virtual address format (232 bit addresses). Note that the BIOS232 Service Interface is the single entry point for all BIOS functions executed from the driver level or kernel threads (see Appendix A). The BIOS232 Service Interface is the single entry point for all BIOS functions executed from the driver level or kernel threads (see Appendix A). These address spaces are guaranteed to be accessible to this driver (only) during the time the Access Driver 246 driver is loaded.

| Input data: | None, do not rely on buffer contents | | |
|---|---|---|---|
| Output data: | Offset 0: | PUCHAR - | BIOS Service Directory Offset into Shadow. |
| | Offset 4: | PUCHAR - | BIOS Shadow Area Base Virtual Address. |
| | Offset 8: | PUCHAR - | BIOS Data Area Base Virtual Address. |
| | Offset 8: | PUCHAR - | BIOS Data Area Base Virtual Address. |
| | Offset 12: | PUCHAR - | BIOS ROM Area Base Virtual Address. |
| Min. Buffer Size: | 16 bytes | | |

7. IOCTL BIOS Read

The IOCTL BIOS Read function is a general purpose reader of either the BIOS ROM, shadow area, or the data area.

| Input Data: | Offset 0: | ULONG - | Mode Flags |
|---|---|---|---|
| | Bit 0: | 1 = | shadow area, 0 = data area. |
| | Bit 2: | 1 = | ROM area (overrides Bit 0) |
| | Offset 4: | PUCHAR - | Offset into the BIOS area to start the read |
| | Offset 8: | ULONG - | Length of the read in bytes. |
| Output Data: | Offset 0: | ULONG - | Length of the actual read |
| | Offset 4: | UCHAR array - | the actual data read |
| Min. Buffer Size: | 16 bytes | | |

Note: If a 'short read' occurs because the offset into the BIOS area specified an overlap with the end of the mapped BIOS memory, no error is returned. Instead the 'actual data read' field accurately indicates how much of the data is valid in the system buffer.

8. IOCTL BIOS Write

The IOCTL_BIOS_Write function is a general purpose writer of either the BIOS ROM, shadow, or the data area.

| Input Data: | Offset 0: | ULONG - | Mode Flags |
|---|---|---|---|
| | Bit 0: | 1 = | shadow area, 0 = data area. |
| | Bit 2: | 1 = | ROM area (overrides Bit 0) |
| | Offset 4: | PUCHAR - | Offset into the BIOS area to start the write |
| | Offset 8: | ULONG - | Length of the write in bytes. |
| Output Data: | Offset 0: | ULONG - | Length of the actual write (zero, or request size) |
| | Offset 4: | UCHAR array - | the actual data read |
| Min. Buffer Size: | 16 bytes | | |

Note: Short writes are not permitted due to the possibility of data corruption.

9. IOCTL BIOS Exec

The IOCTL_BIOS_Exec function is used to execute a BIOS function through the BIOS232 Service Interface. An activation record is passed by value in the system buffer. The AR determines the Base Architecture register contents upon invocation of the entry point to the BIOS. Upon successful completion, the AR contains the Base Architecture context that would normally have been returned to the BIOS caller.

| Input Data: | Offset 0: | ULONG - | Function entry point virtual address. |
|---|---|---|---|
| | Offset 4: | ULONG - | Flags Register |
| | Offset 8: | ULONG - | reserved |
| | Offset 12: | ULONG - | reserved |
| | Offset 16: | ULONG - | reserved |
| | Offset 20: | ULONG - | reserved |
| | Offset 24: | ULONG - | reserved |
| | Offset 28: | ULONG - | reserved |
| | Offset 232: | ULONG - | reserved |
| | Offset 236: | ULONG - | reserved |
| | Offset 240: | ULONG - | reserved |
| | Offset 244: | ULONG - | EBP Register |
| | Offset 48: | ULONG - | EDI Register |
| | Offset 52: | ULONG - | ESI Register |
| | Offset 56: | ULONG - | EDX Register |
| | Offset 260: | ULONG - | ECX Register |

-continued

| | | |
|---|---|---|
| | Offset 64: | ULONG - EBX Register |
| | Offset 68: | ULONG - EAX Register |
| Output Data: | Contents of the system buffer are identical in structure. Register contents may have been influenced by the BIOS function requested. | |
| Min. Buffer Size: | 80 bytes. | |

100. IOCTL RTC Read

The IOCTL_RTC_Read function is used to read the contents of the RTC registers in the CMOS RAM. The data from this atomic read is formatted similarly to the SYSTEMTIME structure and returned to the user in the System Buffer.

| | | | |
|---|---|---|---|
| Input Data: | None, do not rely on buffer contents | | |
| Output Data: | <uses SYSTEMTIME template as shown below> | | |
| | Offset 0: | WORD | current year |
| | Offset 2: | WORD | current month (January = 1) |
| | Offset 4: | WORD | current day of week (Sunday = 0) |
| | Offset 6: | WORD | current day of month (calendar) |
| | Offset 8: | WORD | current hour |
| | Offset 100: | WORD | current minute |
| | Offset 12: | WORD | current second |
| | Offset 14: | WORD | current millisecond |
| Min. Buffer Size: | 32 bytes. | | |

Note that the Year field in the RTC is 8 bits wide. The contents of the Year field in the RTC will be recalculated to a SYSTEMTIME.Year 16 bit field containing the entire value of the current year, AD. Examples: RTC=00, Year=1980; RTC=23, Year=2003. Also note that Legacy RTC devices do not provide the millisecond field in their register set. Because of this, the current millisecond field in the Output Data for this function will always be set to zero.

11. IOCTL VERSION

The IOCTL_Version function returns to the caller the major, an minor version of the Access Driver 246 driver. In addition, the functions implemented by this version of the driver are enumerated in a bitmap. The purpose of the bitmap is for services or higher level drivers to evaluate whether or not this version of the driver can be used for their purposes (at installation time, typically).

| | | | |
|---|---|---|---|
| Input Data: | None, do not rely on buffer contents | | |
| Output Data: | Offset 0: | WORD | Major Version (X.) |
| | Offset 2: | WORD | Minor Version (.x) |
| | Offset 4: | ULONG | Bitmap of implemented functions (see below) |
| | Bit 31: | | 1 if IOCTL_Locate implemented |
| | Bit 230: | | 1 if IOCTL_BIOS_Read implemented |
| | Bit 29: | | 1 if IOCTL_BIOS_Write implemented |
| | Bit 28: | | 1 if IOCTL_BIOS_Exec implemented |
| | Bit 27: | | reserved |
| | Bit 26: | | reserved |
| | Bit 25: | | reserved |
| | Bit 24: | | 1 if IOCTL_RTC_Read implemented |
| | Bit 23: | | reserved |
| | Bit 22: | | reserved for Phlash interlock |
| | Bit 21: | | reserved for online setup (NVRAM writes) |
| | Bit 20–0: | | reserved for future expansion |

-continued

| | | |
|---|---|---|
| | Bit 230: | 1 if IOCTL_BIOS_Read implemented |
| Min. Buffer Size: | 16 bytes | |

12. IOCTL PM Suspend

The IOCTL_PM_Suspend function causes IRP_MJ_PNP_POWER, IRP_MN_LT_SUSPEND IRP's to be sent to each device that has registered itself using the Access Driver DriverReg entry point.

Input Data: None, do not rely on buffer contents
Output Data: None, do not rely on buffer contents 13. IOCTL PM Resume The IOCTL_PM_Resume function causes IRP_MJ_PNP_POWER, IRP_MN_LT_RESUME IRP's to be sent to each device that has registered itself using the Access Driver DriverReg entry point.

| | |
|---|---|
| Input Data: | None, do not rely on buffer contents |
| Output Data: | None, do not rely on buffer contents |

B. Error Codes Returned by Access Driver 246

The following table defines the error status returned when an IRP is unsuccessfully or only partially completed. Conditions of termination of the functions are given as well. This table is necessary because there is not necessarily a one-to-one correspondence between NTSTATUS values known by the operating system and those used by the Access Driver 246 device driver. In order to reverse translate the codes back into strings usable by an applications writer or an end-user, it is mandatory that only NTSTATUS error codes be used.

TABLE 2

NTSTATUS Codes returned from Access Driver 246

| NTSTATUS | Function | Condition at Termination |
|---|---|---|
| STATUS_SUCCESS | All | Request succeeded |
| STATUS_SOME_NOT_MAPPED | DriverEntry | One or more of memory or I/O areas could not be mapped in. Driver load fails. |
| STATUS_NOT_IMPLEMENTED | All | Requested function is not implemented in this driver. |
| STATUS_ACCESS_DENIED | All IOCTL functions | Device is unusable by caller because another service has exclusive access or because the BIOS Service Directory signature is not present. |
| STATUS_MEDIA_CHECK | All IOCTL functions - not implemented - | Contents of BIOS ROM may have been changed. New call to IOCTL_Locate is required. |

C. BIOS 232 bit Entry Point Specification

In order for IOCTL_Locate to find the entry point for the BIOS, the BIOS 232-bit Service Directory is used. A description of the BIOS 232-bit Service Directory is described in Appendix C. The signature that Access Driver 246 will use when locating and executing BIOS functions shall be "_32_".

If the WinntEntry (BIOS232 Service Directory) structure is not found subject to the conditions stated above, the Access Driver 246 driver will fail at load time, and DriverEntry will indicate that it was unable to initialize as per Table 2.

D. Real-Time Clock Hardware Access

In order to implement the IOCTL_RTC_Read function, it is necessary to define the RTC's registers and methods of access. The RTC registers are located in the CMOS RAM's I/O address space. Only the RTC registers are shown in Table 3. The registers are accessed by outputting a CMOS physical memory address to port 0×70, and then reading the subject 8 bit register at port 0×71. The CMOS physical memory address is set to point to 0×0D after all RTC register have been read.

TABLE 3

RTC Registers

| Register Name | CMOS Address, Comments |
| --- | --- |
| Year | 9 - years since 1980 |
| Month | 8 - 1 = January |
| Date | 7 |
| Day of Week | 6 - zero equals Sunday |
| Hour | 4 |
| Minute | 2 |
| Seconds | 0 |

Figure 6A:
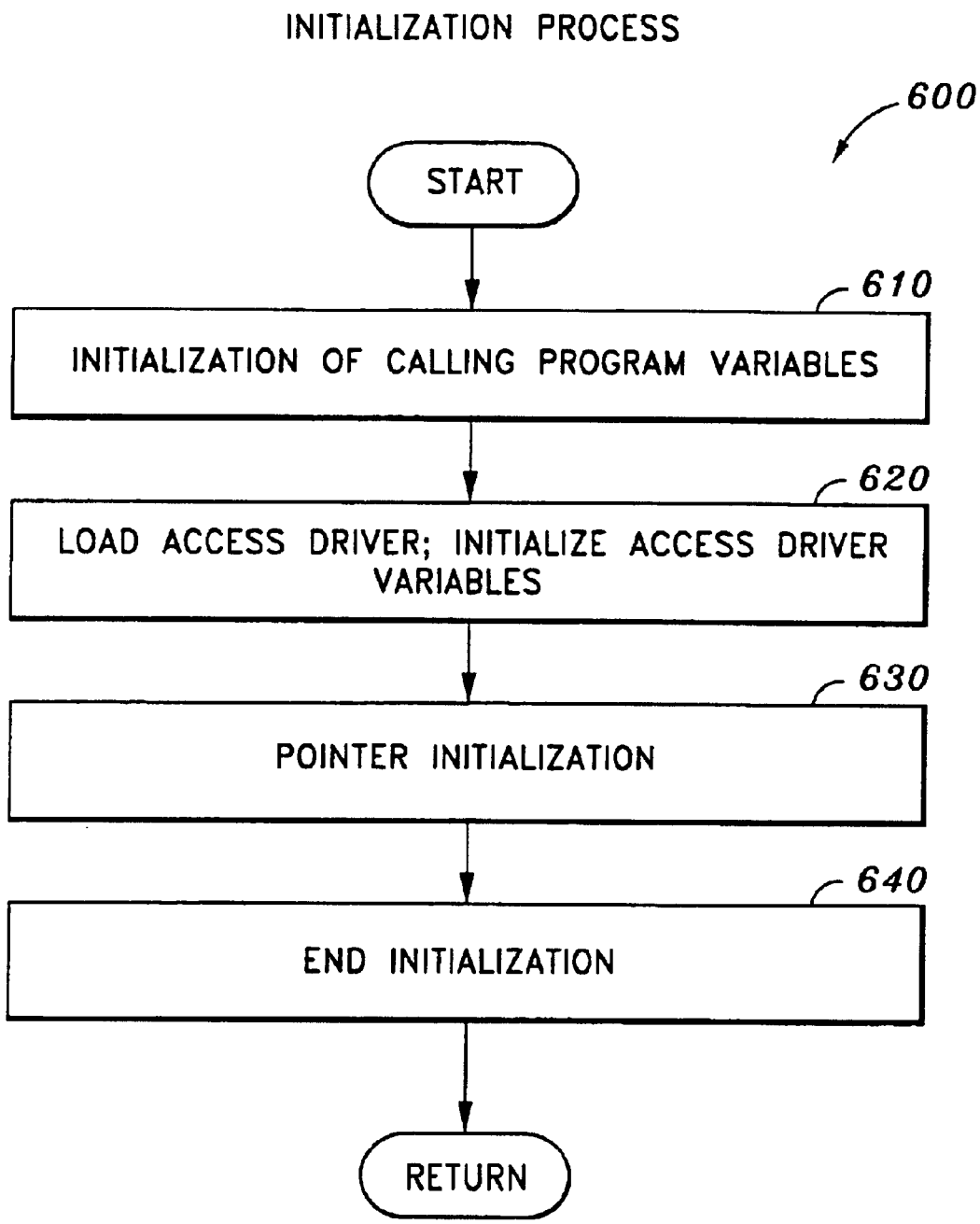
FIG. 6A is a flowchart illustrating one embodiment of the initialization process of the present invention.

FIG. 6A is a flowchart illustrating one embodiment of the initialization process of the present invention. Beginning from a start state, process 600 proceeds to block 610, the variables for the calling program (i.e., the I/O Manager 242) are initialized. Details of this initialization process 6100 are provided in FIG. 6B and the accompanying text. Process 600 then proceeds to block 620 where it loads the access driver 246. Initialization of the access driver variables then occurs. During the initialization process, two particularly essential initializations occur: (a) the BIOS shadow area 260 (which includes a BIOS Service Directory 62) located in physical memory 250 and (b) the BIOS data area 264, also located in physical memory 250, are both mapped into the access driver's 246 virtual memory (shown in FIG. 4 as the BIOS shadow area 270 (which includes the BIOS Service Directory 272) and the BIOS data area 274) of the access driver 246.

Process 600 then advances to block 630, where pointer initialization occurs. Details of block 630 are provided in FIG. 6C and the accompanying text. The process 600 then advances to block 640, where initialization ends. Process 600 then terminates.

Figure 6B:
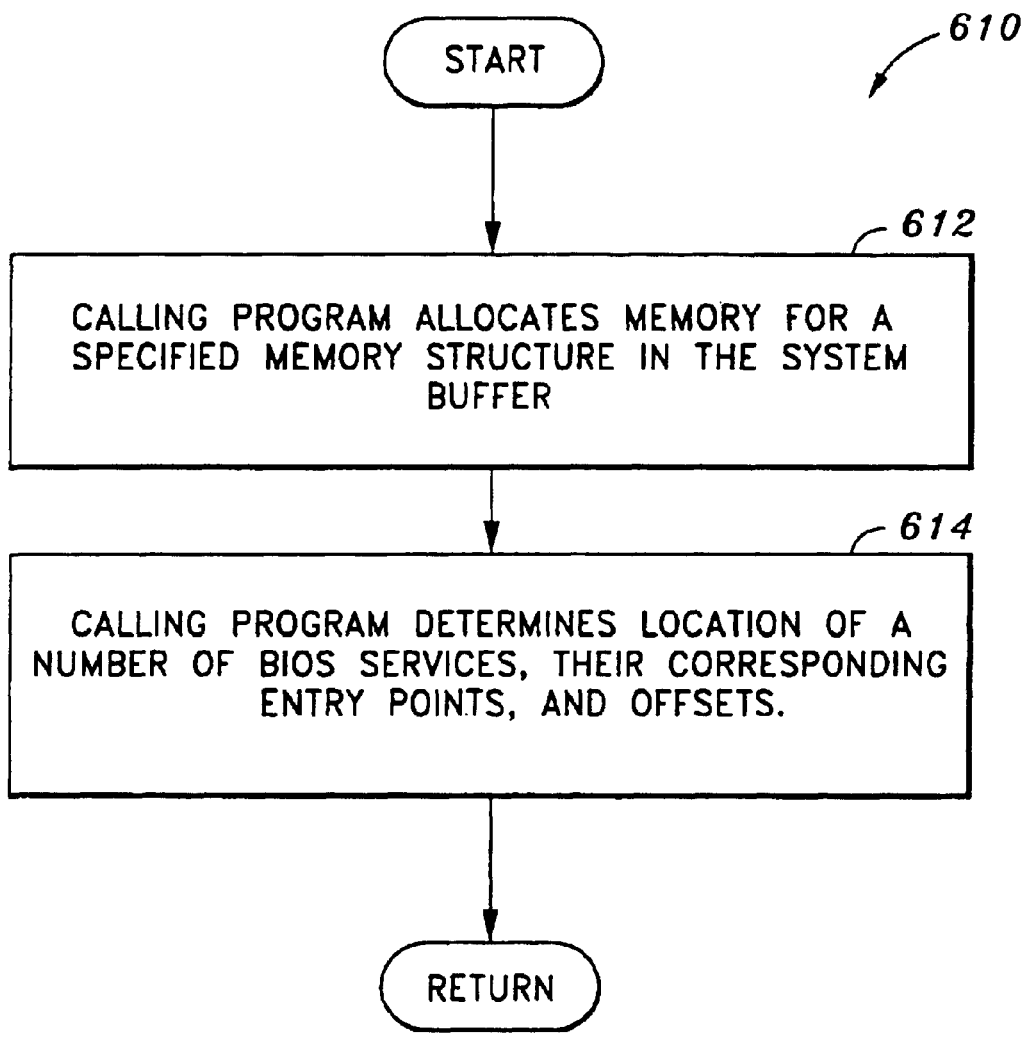
FIG. 6B is a flowchart illustrating the details of process block 610 of FIG. 6A.

FIG. 6B is a flowchart illustrating the details of block 610. Beginning from a start state, process 610 proceeds to block 612, where the calling program from the I/O Manager 242 allocates memory for a specified memory structure in the system buffer. The process 610 then advances to process block 614, where the calling program from the I/O Manager 242 determines the location of a number of BIOS functions, their corresponding entry points, lengths and offsets. In one embodiment, this is accomplished by entering the address field of the specified memory structure for the corresponding BIOS function with the virtual address of the BIOS function and by providing a 4-byte ASCII string identifying each BIOS function. Initialization of the calling program then terminates.

Figure 6C:
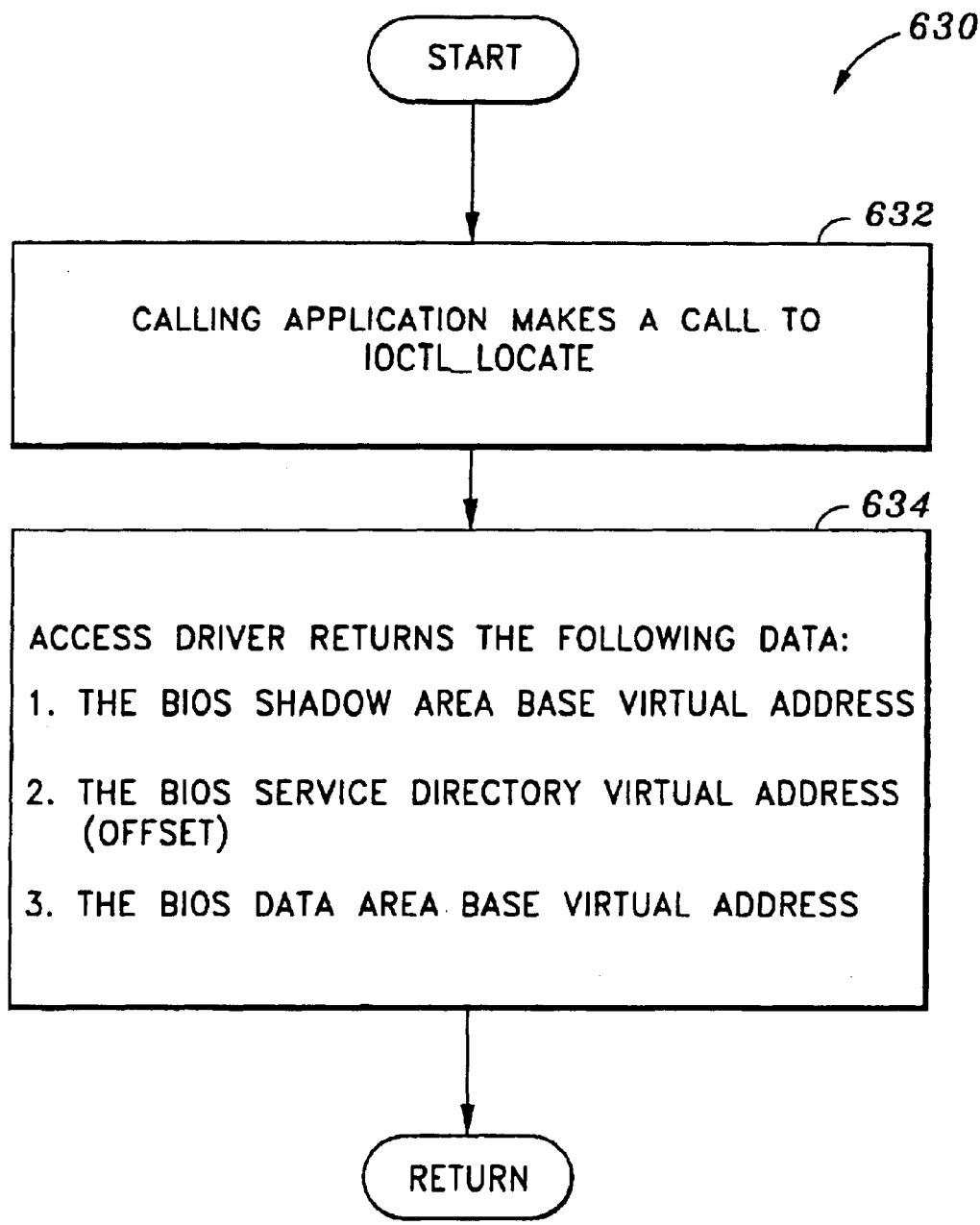
FIG. 6C is a flowchart illustrating the details of process block 630 of FIG. 6A.

FIG. 6C is a flowchart illustrating the details of process block 630 of FIG. 6A. Beginning from a start state, the calling application program 232 or service 234, through the class driver, makes a call to IOCTL_Locate, as shown in block 632. In response, the access driver 246 performs a search for the BIOS Service Directory 272 header, as shown in process block 634. Upon finding and validating the BIOS Service Directory 272, the access driver 246 obtains the virtual address of the BIOS Service Directory 272 header, which provides the offset of the BIOS Service Directory 272 header virtual address from the base virtual address of the BIOS shadow area 270. The process 630 then returns control to the calling application program 232 or service 234.

Figure 7A:
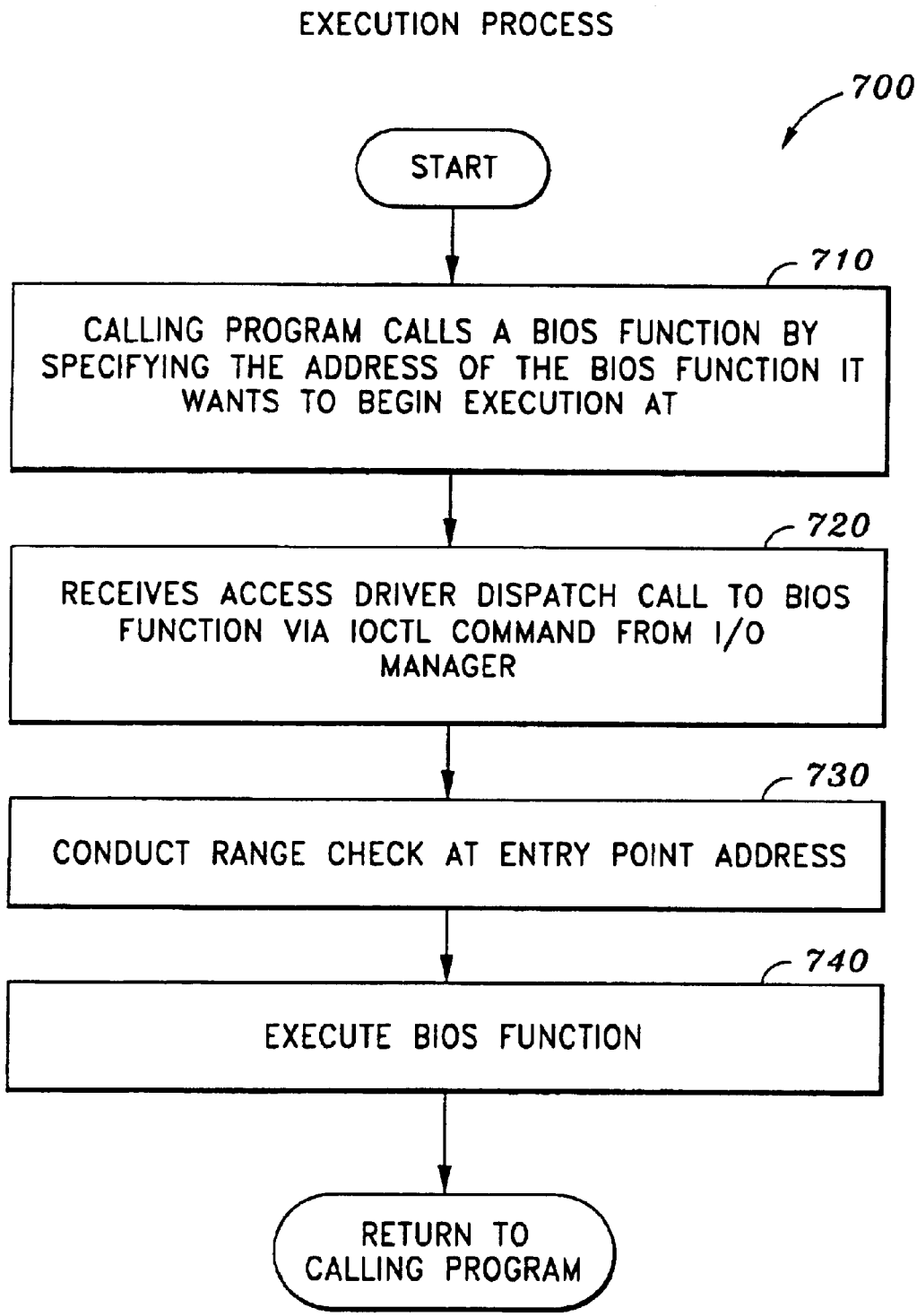
FIG. 7A is a flowchart illustrating the execution process of the present invention.

FIG. 7A is a flowchart illustrating the calling execution process of the present invention. Beginning from a start state, the process 700 proceeds to process block 710, where the calling program calls a BIOS function by providing to the access driver 246, the address of the BIOS function it wants to begin execution at. The process 700 then proceeds to process block 720, where the access driver 246 receives a dispatch call to a BIOS function via an IOCTL command from the I/O Manager 242 (see FIG. 4). The process 700 then proceeds to process block 730, where the access driver 246 conducts a range check of the entry point address. In particular, the access driver 246 determines if the entry point address is within the range of addresses mapped to the BIOS shadow area, exclusive of the service directory header. If not, the access driver 246 indicates that the starting virtual address is not within the range of addresses mapped from the physical memory to the virtual memory. This may be indicated through the use of a flag. If the range check is successful, the process 700 proceeds to process block 740, where the access driver 246 executes the BIOS function called. The process 700 then terminates.

Figure 7B:
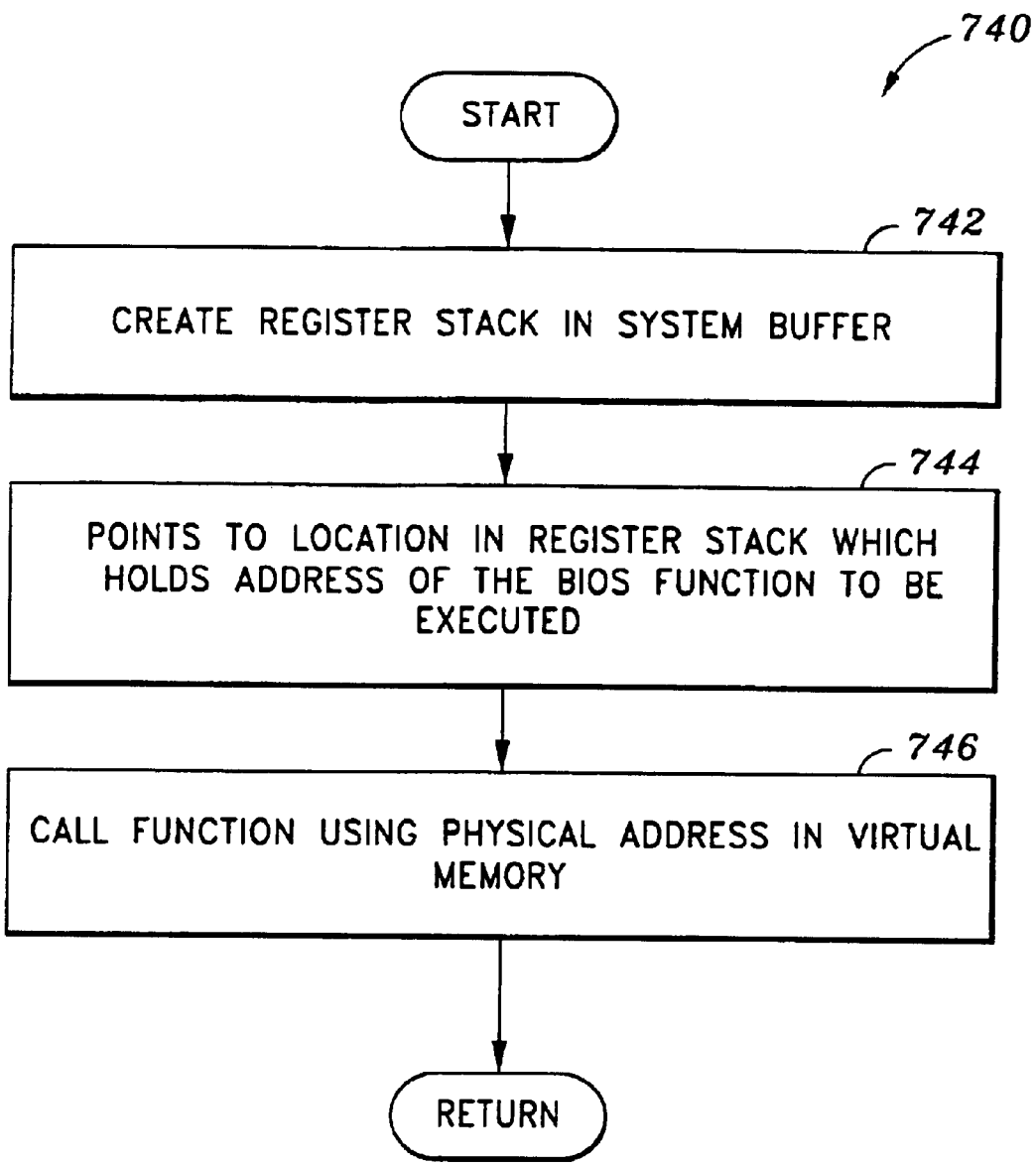
FIG. 7B is a flowchart illustrating the details of process block 640 of FIG. 7A.

FIG. 7B is a flowchart illustrating the details of process block 740 of FIG. 7A. Beginning from a start state, the process 740 proceeds to process block 742, where the access driver 246 creates a register stack in a system buffer previously specified by the program from the I/O Manager 242. The process 730 then advances to process block 744, where the access driver 246 provides a pointer to the register stack which holds the address of the BIOS function to be executed. The process 740 then proceeds to process block 746, where the calling program from the I/O Manager 242 calls and executes the function whose beginning address is indicated by the pointer, using its physical address as mapped in virtual memory. The process 740 then terminates.

An example of the utilization of the IOCTL_BIOS_EXEC function in the access driver 246 will now be provided. Initially, the application program 232 or service 234 makes a call to the access driver 246 using the command IOCTL_Locate. The data returned by the access driver 246 includes the BIOS Shadow Area Base Virtual Address, the BIOS Service Directory offset from the BIOS Shadow Area Base Virtual Address, and the BIOS Data Area Base Virtual Address.

The following act is then utilized to determine the existence of a BIOS service, its entry point, length and address offset. A calling program from the I/O Manager 242 first allocates memory for a register structure, such as IOC_EXEC1 and then fills in the biosFunction field of the structure with the virtual address given by the IOCTL_Locate function. The other register values are filled in as follows: a 4-byte ASCII string identifying the BIOS service is loaded into the eax register and a zero is loaded into the ebx register.

Next, the caller invokes the IOCTL_BIOS_Exec function of the access driver 246 with the contents of the IOC_EXEC1 structure copied into the system buffer for the IOCTL call. The BIOS function is then executed. The IOCTL_BIOS_Exec function of the access driver 246 returns, with register values for eax, ebx, ecx and edx each containing responses from the service directory. The calling program of the I/O Manager 242 then takes the information returned from the service directory and creates a biosFunction entry point and a structure in the system buffer. It then calls the BIOS function using the IOCTL_BIOS_Exec function in the access driver 246. Returned data are passed in the same IOC_EXEC1 structure.

Examples of the processes shown in FIGS. 6A, 6B, 7A and 7B are illustrated in Appendices D1–D3. In particular, Appendix D1 illustrates exemplary source code for the application program 232, service 234 or class driver 240, used in calling a BIOS function through the class driver 246. Appendices D2 and D3 illustrate exemplary source code for the access driver 246. Appendix D2 illustrates exemplary source code for executing a BIOS function in the shadow area, while Appendix D3 illustrates exemplary source code for creating a register stack and for calling the entry point for executing the BIOS function.

Through the use of the present invention, a system and method for accessing and executing the contents of physical memory from a virtual memory subsystem is provided. The system and method facilitates increased addressing capability for memory and input/output operations, and also allows execution of processor instructions in physical memory space.

Secure Utilization of BIOS services

Another aspect of the present invention includes a system and method for securely utilizing Basic Input and Output System (BIOS) services. In the following detailed description, the following terms are used to described the current invention:

- A "key" is an encoding and/or decoding parameter in accordance with conventional cryptographic algorithms such as Rivest, Shamir and Adleman (RSA), Data Encryption Algorithm (DEA) as specified in Data Encryption Standard (DES), and the like.
- A "key pair" includes a "private" key and a "public" key. A "private key" is held by the owner of the key pair and is used to generate digital signatures. A "public" key is widely published and is used to verify digital signatures. A public key is usually published in the form of a digital "certificate".
- A "digital signature" is a digital quantity that is generated using a digital message and a private key. A digital signature cannot be computed without knowing the private key. A digital signature can be verified using the digital message and a public key corresponding to the private key. Successful verification confirms that the digital message is indeed the one which was signed and that the signature was generated using the private key corresponding to the public key.
- A "certificate" is a digital message containing at least a public key, a private key, and a digital signature created using the private key.

Figure 8:
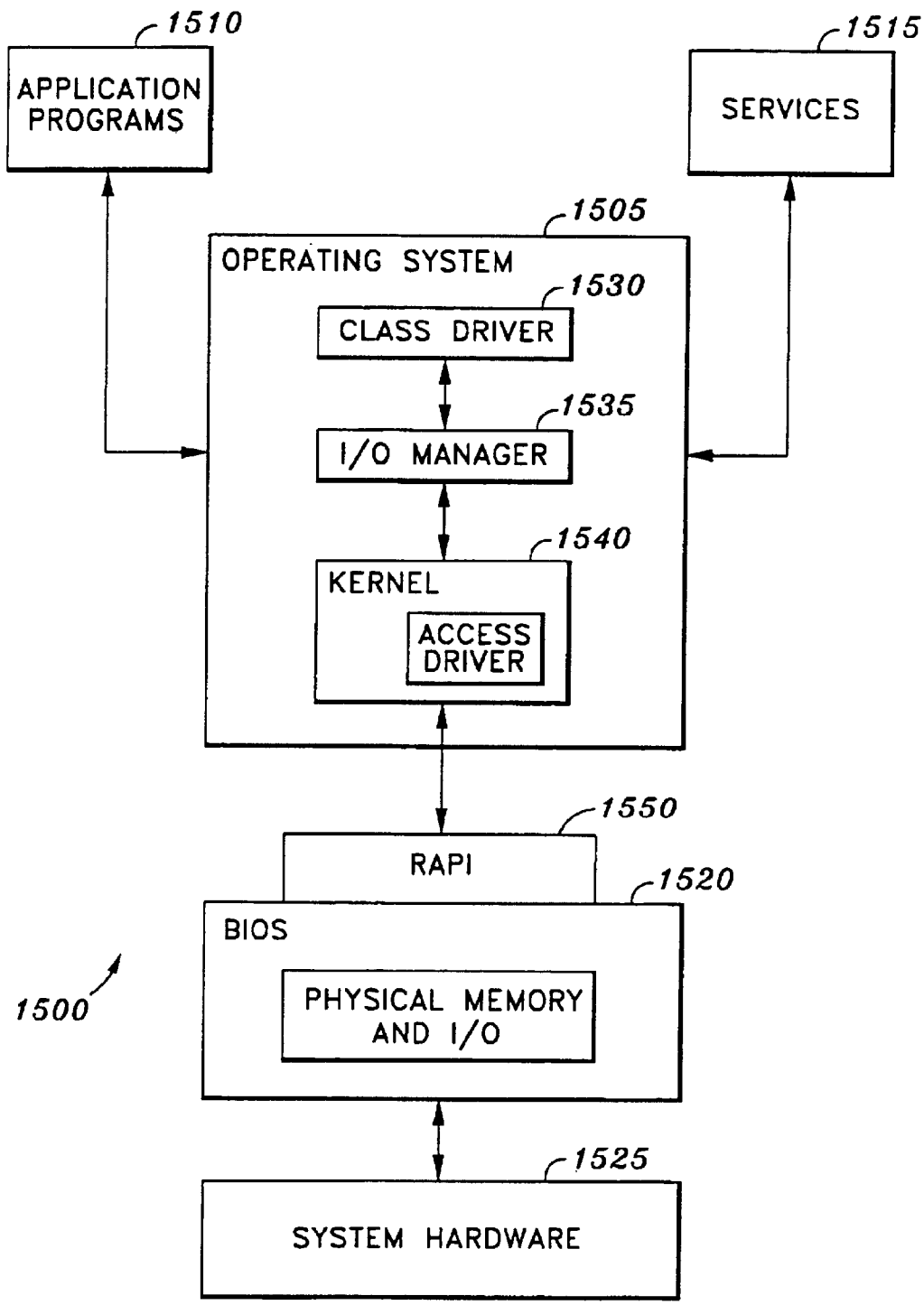
FIG. 8 is another overall functional block diagram illustrating the architecture of an operating system which utilizes the system and method of the present invention.

FIG. 8 is an overall functional block diagram illustrating the architecture of a processing system 1500 utilizing the system and method of the present invention. The processing system 1500 comprises an operating system 1505 which supports application programs 1510 and services 1515, Basic Input/Output System (BIOS) 1520 and system hardware 1525. BIOS 1520 is a collection of drivers, or software interfaces for hardware devices such as the console (keyboard and display), a generic printer, the auxiliary device (serial port), the computer's clock and the boot disk device. BIOS 1520 is typically embedded in non-volatile memory.

The operating system 1505 includes a class driver 1530 which interfaces with application programs 1510 and services 1515, and an I/O Manager 1535. The I/O Manager 1535 converts I/O requests from application programs 1510 and services 1515 (made via class driver 1530) into properly sequenced calls to various driver routines located in the kernel 1540. In particular, when the I/O Manager 1535 receives an I/O request, it uses the function codes of the request to call one of several dispatch routines in a driver located in the kernel 1540. The kernel 1540 provides hardware-independent functions, called system functions, that are accessed by means of a software interrupt. The functions provided by the kernel 1540 typically include file and directory management, memory management, character device input/output and time and date support, among others. In one embodiment, the operating system 1505 a Windows operating system. In alternate embodiments, the operating system 1505 includes the Solaris or the AIX operating systems or other operating systems based on demand-paged virtual memory subsystems.

The present invention provides an access driver 1545, located within the kernel 1540, which is responsible for interfacing with the ROM Application Programming Interface (RAPI) 1550 to access or update data located in BIOS 1520 or access system hardware data via the BIOS. RAPI 1550 generally provides an interface for securely utilizing BIOS services or functions. A more detailed description of RAPI is provided below.

In one preferred embodiment, the access driver 1545 comprises source code written in the C language. It is understood that other assembly languages may be utilized in implementing the functions of access driver 1545. In one preferred embodiment, a set of entry-points or functions calls are available to application programs 1510, services 1515 or class driver 1530 which utilize access driver 1545. The access driver 1545 can be opened, closed, and can receive input/output ("I/O") control codes ("IOCTLs") through these entry points.

Figure 9:
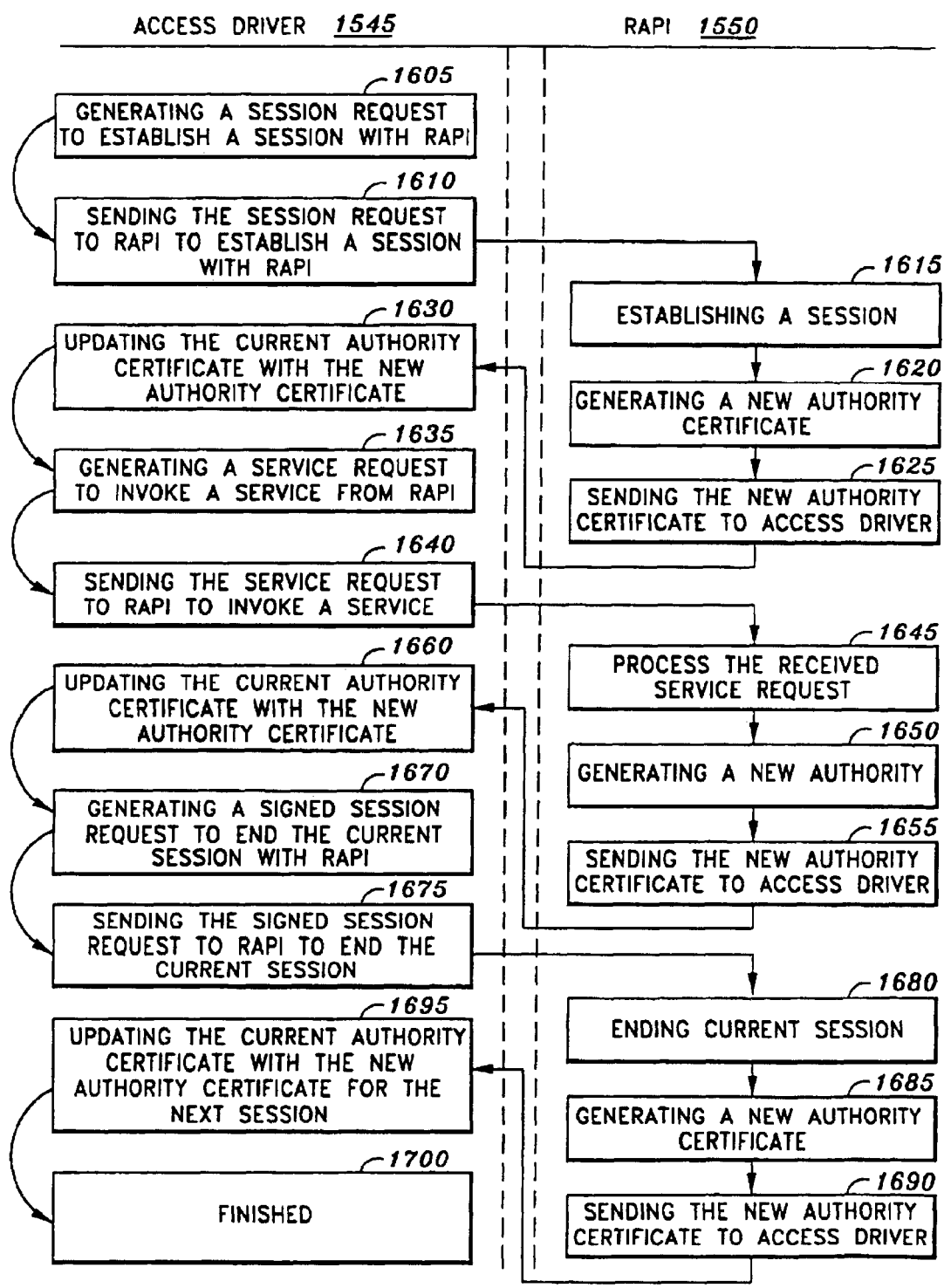
FIG. 9 shows an illustrative sequence of interactive sequence between two system components in accordance with one embodiment of the current invention.

FIG. 9 shows an illustrative sequence of interactive sequence between access driver 1545 and RAPI 1550 in accordance with one embodiment of the current invention. In a present system, a work session must be established between access driver 1545 and RAPI 1550 before access driver 1545 can send one or more service requests to RAPI 1550 to utilize BIOS services. To establish a work session with RAPI 550, access driver 1545 generates a session request (block 1605) and send the request to RAPI 1550 (block 1610).

Figure 12:
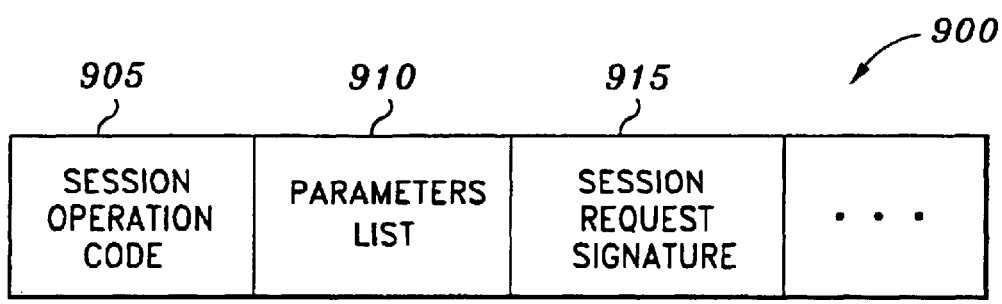
FIG. 12 shows a session request in accordance with one embodiment of the current invention.

The format of one embodiment of a session request 900 is shown in FIG. 12. Each session request 900 includes a session operation code 905, a list of parameters 910, and a session signature 915. Session operation code 905 is a numerical value representing one type of session operation. Illustrative examples of session operations in one embodiment may include an operation to begin or establish a session and an operation to end or terminate the session. Each type of session operation may require a list of one or more parameters 910. In one embodiment, the list of parameters 910 may be a pointer to a memory location where the parameters reside. Each session request 900 also includes a session request signature 915 to prevent a foreign code segment, such as a computer virus, to capture and replay the request and corrupt the BIOS.

Figure 10:
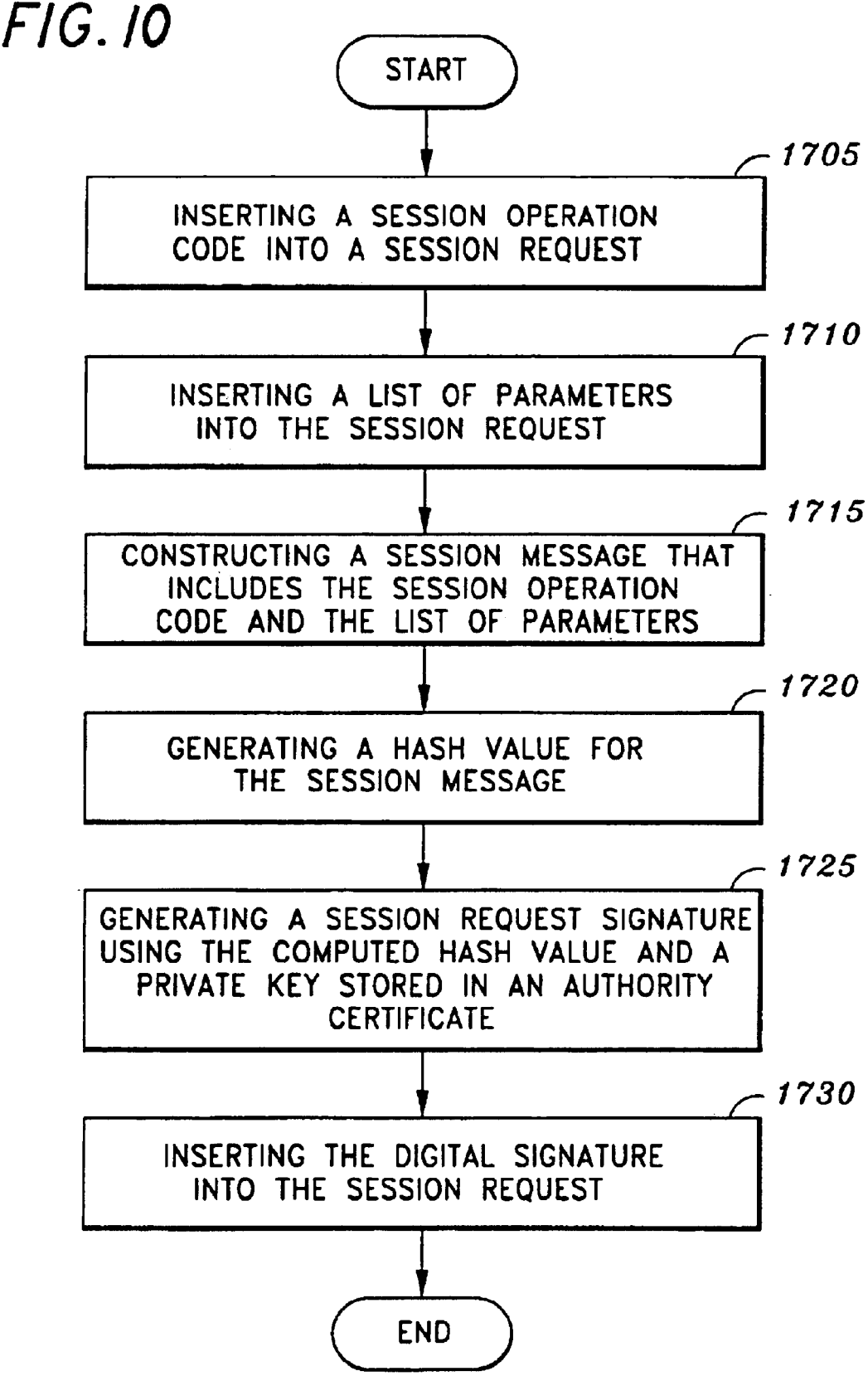
FIG. 10 outlines the generation of a session request in accordance with one embodiment of the current invention.

FIG. 10 outlines the generation of a session request. In blocks 1705 and 1710, the session operation code representing a desired session operation and the list of parameters required for that desired session operation is inserted in the session request. Blocks 1715, 1720, and 1725 show the creation of a session request signature. In the art of cryptography, the act of creation of a digital signature for a message is known as "signing" the message. It should be noted that algorithms to sign a message or to create digital signatures for a message are known in the art. It should be further noted that existing algorithms for creating digital signatures generally include computing a hash value of the message to be signed and encrypting the hash value using a private key, as shown in blocks 1715, 1720, and 1725.

It is contemplated that the Digital Signature Algorithm ("DSA") proposed by the National Institute of Standards and Technology may be used. It is also contemplated that the Rivest, Shamir, and Adleman ("RSA") algorithm may be used. It should be noted, however, that other algorithms for generating digital signatures may also be employed in the present invention.

As shown in block 1715 of FIG. 10, a session message is formed such that it contains the session operation code and the list of parameters. In block 1720, a hash value for the session message is computed. It should be noted that algorithms to compute hash values are well known in the art. Those skilled in the art will recognize that a hash function suitable for use in embodiments of the present invention is one that can compute one-way and collision-free hash values. In block 1725, a session request signature is generated by encrypting the computed hash value for the session message using a private key stored in a current authority certificate.

Figure 11:
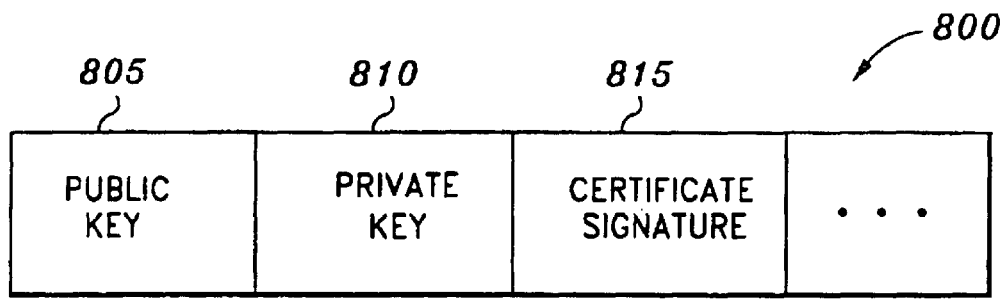
FIG. 11 shows an authority certificate in accordance with one embodiment of the current invention.

An authority certificate generally contains sufficient information to enable system components, such as access driver 1545 and RAPI 1550 (shown in FIG. 9), to generate secured session or service requests and to verify the integrity of those requests. FIG. 11 shows the format of an authority certificate 800 in accordance with one embodiment of the current invention. The exemplary authority certificate includes at least the following fields: a public key 805, a private key 810, and a certificate signature 815. As described later, information stored in the authority certificate is used to enforce security limits of session and service requests.

Returning to block 1615 in FIG. 9, RAPI 1550 establishes a session as specified in the session request sent by access driver 1545 in block 1610. The acts required to establish a session are outlined in FIG. 14. In block 1105, a message is constructed from the session operation code and list of parameters available in a session request received from the access driver. A hash value for the constructed message is computed (block 1110). The session request signature is extracted from the session request and decrypted using the public key included in RAPI's copy of the current authority certificate (block 1115). As shown later, RAPI is responsible for generating and supplying authority certificates to the access driver. RAPI, however, also maintains a copy of the most current authority certificates for its own use. In block 1120, the decrypted session signature is compared to the computed hash value for the constructed message. If the computed hash value equals the decrypted session request signature, RAPI proceeds to start a session (block 1125).

Returning to FIG. 9, after it establishes a session, RAPI 1550 generates a new authority certificate (block 1620). As stated above, RAPI 1550 maintains a copy of the new authority certificate for its own use. RAPI 1550 replaces the existing authority certificate with the new certificate. After the replacement, the new certificate becomes the most current certificate.

Figure 18:
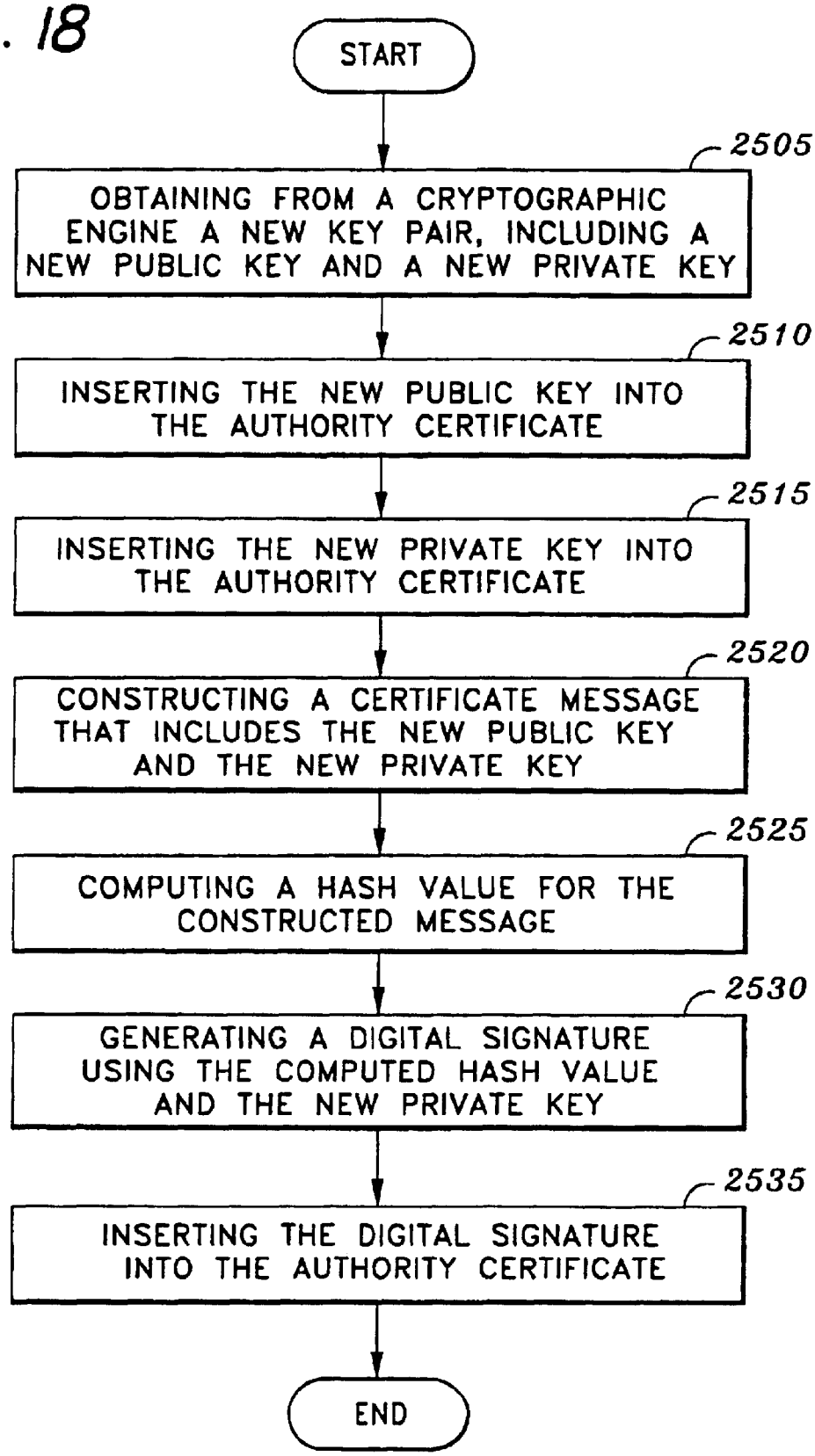
FIG. 18 shows the process of generating an authority certificate in accordance with one embodiment of the current invention.

FIG. 18 shows the process of generating an authority certificate. To generate an authority certificate, a new key pair is obtained from a provided cryptographic engine (block 2505). As defined above, a new key pair includes a public key and private key. The new keys are inserted in the new authority certificate (blocks 2510 and 2515). A certificate message is formed such that it includes both the new public and private keys (block 2520). A hash value for the certificate message is computed (block 2525). A certificate signature is generated using the hash value for the certificate message and the new private key (block 2530). The certificate signature is then inserted into the new authority certificate (block (2535).

Returning to FIG. 9, RAPI 1550 sends the new authority certificate back to the access driver 1545 (block 1625). Upon receiving the new authority certificate, access driver 1545 updates the current authority certificate with information in the new certificate (block 1630). Accordingly, the information in the new authority certificate will be used to generate subsequent service requests. In block 1635, access driver 1545 generates a service request to invoke a function provided by RAPI 1550.

Figure 13:
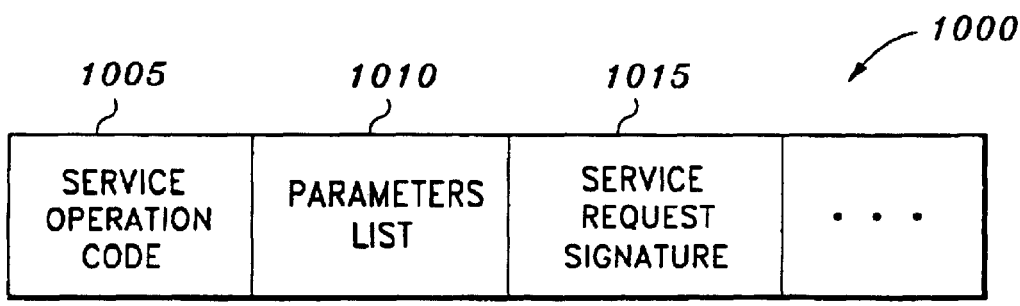
FIG. 13 shows a service request in accordance with one embodiment of the current invention.
Figure 14:
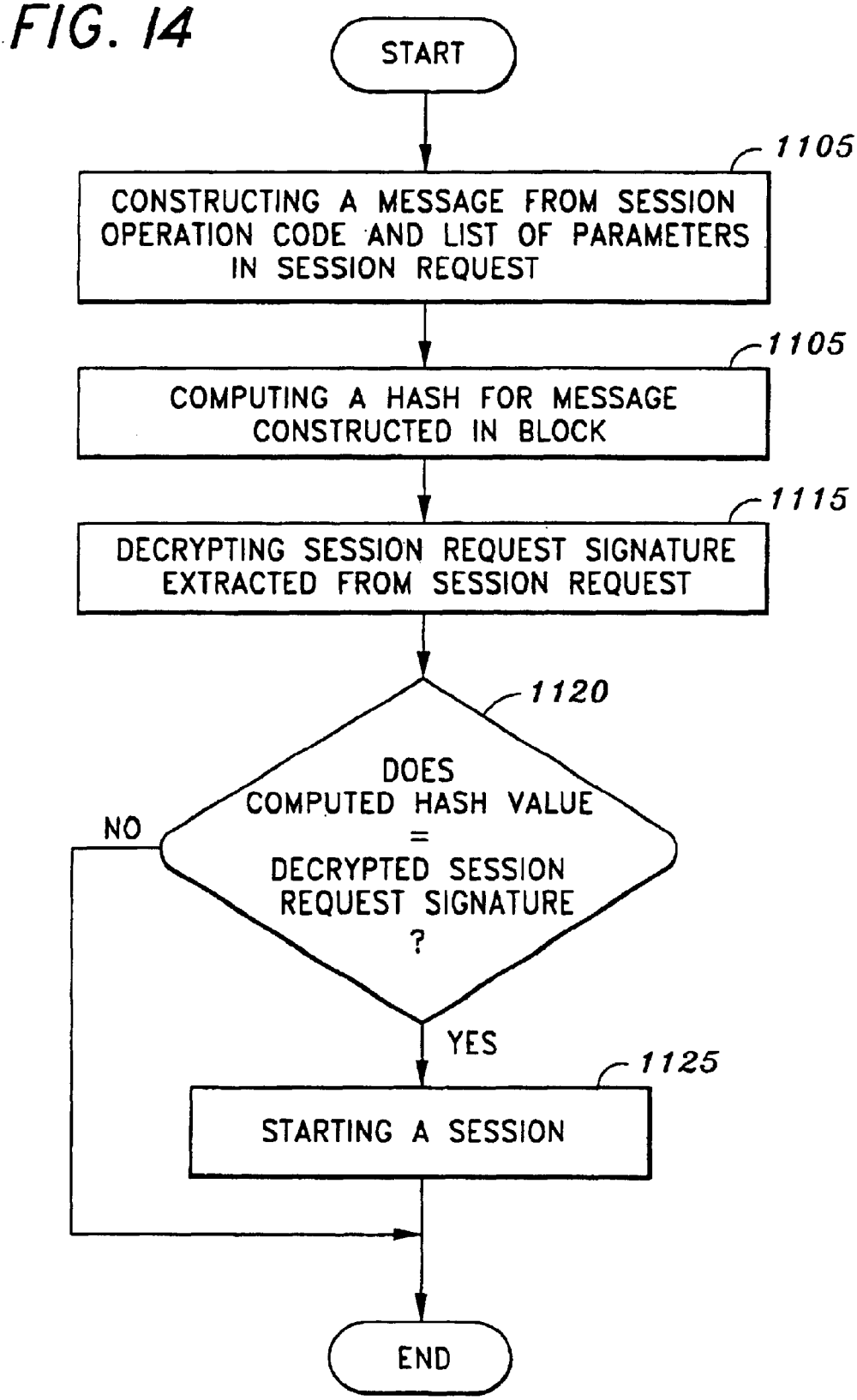
FIG. 14 outlines the acts required to establish a work session in accordance with one embodiment of the current invention.

FIG. 13 shows the format of a service request 1000 in accordance with one embodiment of the current invention. Each service request 1000 includes a service operation code 1005, a list of parameters 1010, and a service request signature 1015. Service operation code 1005 is a numerical value representing one type of service operation. Illustrative examples of service operations in one embodiment may include operations to read or write data stored in non-volatile memory. Each type of service operation may require one or more parameters that are included in the list of parameters. In one embodiment, the list of parameters may be a pointer to a memory location where a bundle of parameters reside. Each service request 1000 further includes a service request signature 1015 to prevent a foreign code segment, such as a computer virus, to capture and replay the service request to disable or cause havoc to the system.

Figure 15:
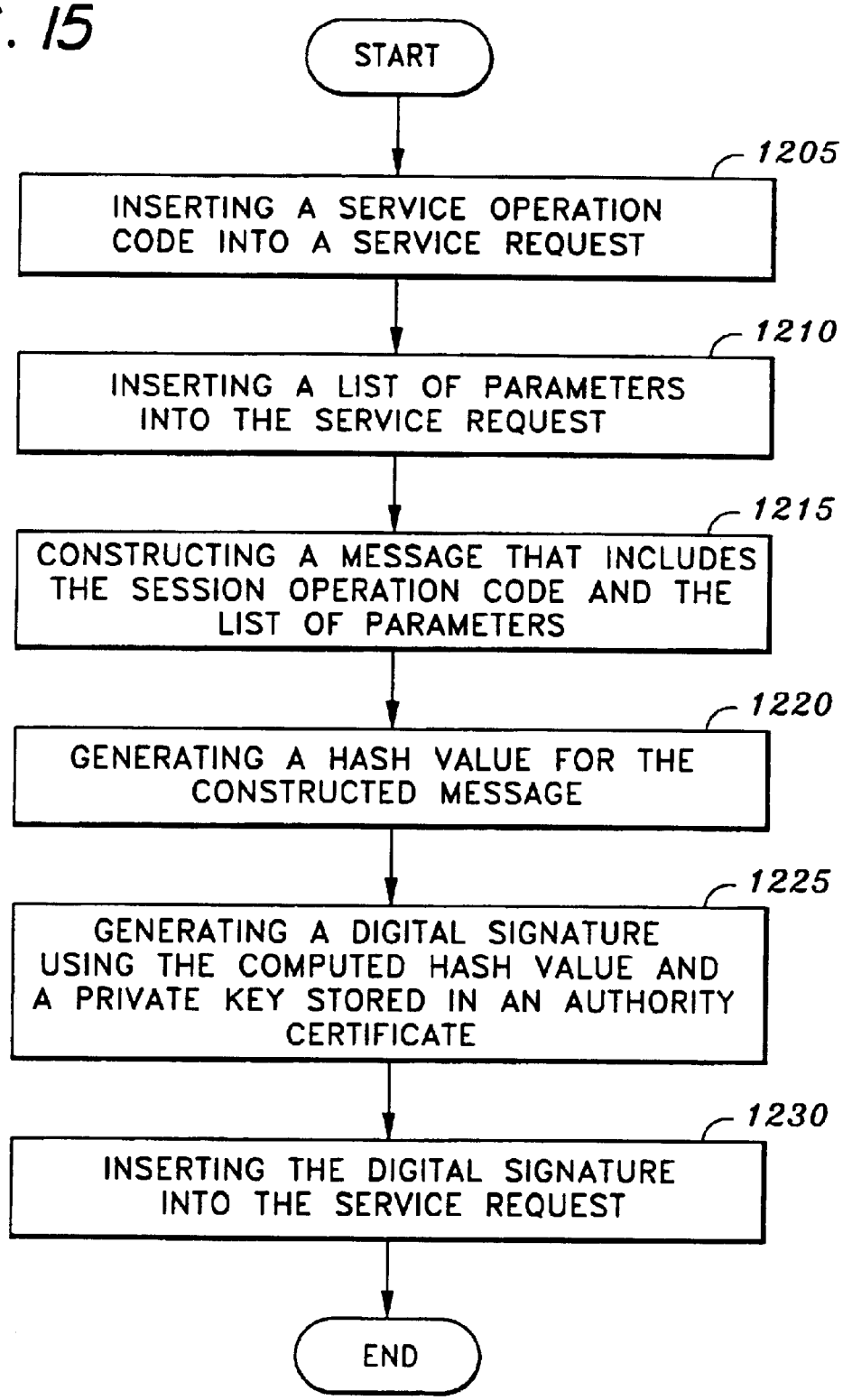
FIG. 15 outlines the generation of a service request in accordance with one embodiment of the current invention.

FIG. 15 outlines the generation of a service request in accordance with one embodiment of the current invention. In blocks 1205 and 1210, the service operation code representing a desired service operation to be performed and the list of parameters required for that desired operation are inserted in the service request. Blocks 1215, 1220, and 1225 show the creation of a service request signature. Once created, the service request signature is inserted in the service request (block 1230).

Figure 16:
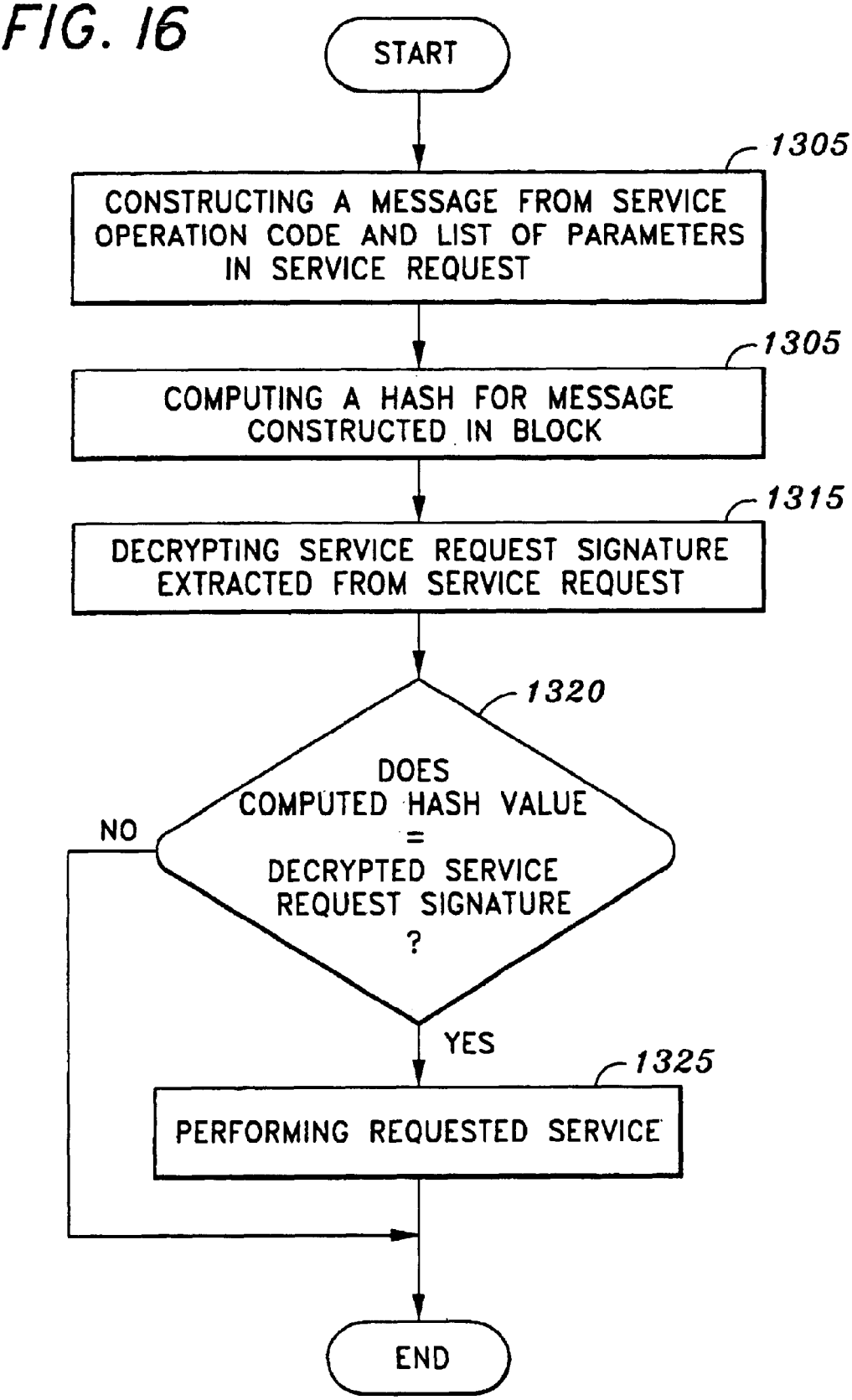
FIG. 16 shows the acts required in processing of a service request in accordance with one embodiment of the current invention.

Returning to FIG. 9, access driver 1545 sends the service request generated in block 1635 to RAPI 1550 (block 1640). Upon receiving the service request, RAPI 1550 processes the request (block 1645). FIG. 16 shows the acts required in processing of a service request in accordance with one embodiment of the current invention. In block 1305, a message is constructed from the service operation code and list of parameters available in the service request received from access driver. A hash value for the constructed message is computed (block 1310). The service request signature is extracted from the session request and decrypted using the public included in RAPI's copy of the current authority certificate (block 1315). In block 1320, the decrypted session signature is compared to the computed hash value for the constructed message. If the computed hash value equals the decrypted session request signature, RAPI performs the service specified in the service request (block 1325). Otherwise, the specified service will not be performed.

Returning to FIG. 9, after it processes a service request, RAPI 1550 generates a new authority certificate (block 1650). As described above, FIG. 15 shows the process of generating an authority certificate. RAPI 1550 maintains a copy of the new authority certificate for its own use. RAPI 1550 also sends a copy of the new authority certificate back to access driver 1545.

Upon receiving the new authority certificate, access driver 1545 updates the current authority certificate with information in the new certificate (block 1630). Accordingly, the information in the new authority certificate will be used to generate subsequent service requests. In block 1635, access driver 1545 generates a session request to request RAPI 1550 to end the current session. As described above, FIG. 10 outlines the acts involved in generating a session request. Following the generation of a session request, access driver 1545 sends the request to RAPI 1550.

Figure 17:
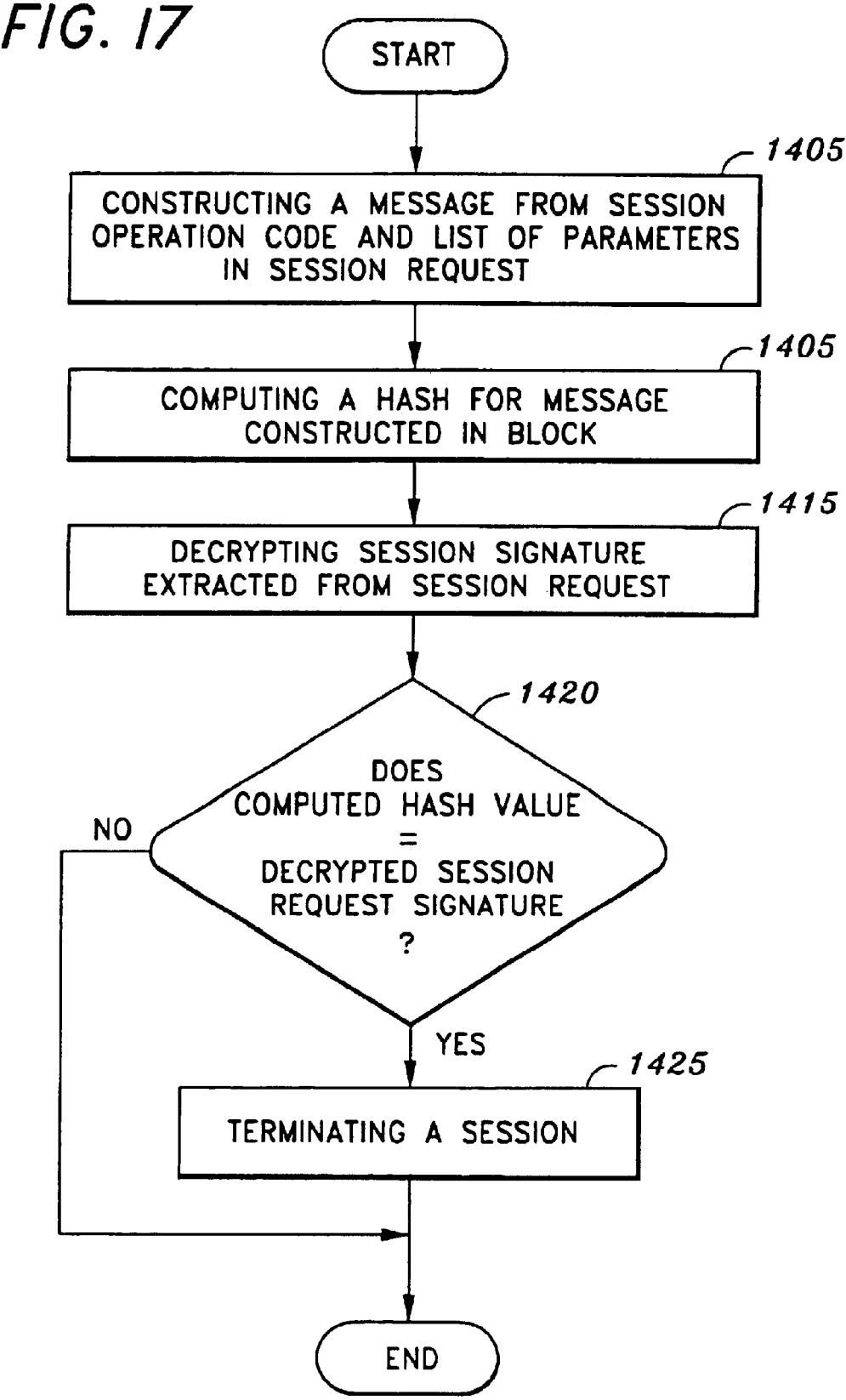
FIG. 17 shows the acts involved in ending the current work session in accordance with one embodiment of the current invention.

Upon receipt of the session request to end or terminate the session, RAPI 1550 ends the session (block 1680). FIG. 17 shows the acts involved in ending the current session. In block 1405, a message is constructed from the session operation code and list of parameters available in a session request received from the access driver. A hash value for the constructed message is computed (block 1410). The session request signature is extracted from the session request and decrypted using the public key included in RAPI's current authority certificate (block 1415). In block 1420, the decrypted session signature is compared to the computed hash value for the constructed message. If the computed hash value equals the decrypted session request signature, RAPI proceeds to end the current session (block 1425).

Returning to FIG. 9, after it ends a session, RAPI 1550 generates a new authority certificate (block 1685). As described above, FIG. 15 shows the process of generating an authority certificate. RAPI 1550 then sends the new authority certificate back to the access driver 1545 (block 1690). Upon receiving the new authority certificate, access driver 1545 updates the current authority certificate with information in the new certificate (block 1695). Accordingly, the information in the new authority certificate will be used to generate requests in subsequent sessions.

FIG. 9 shows that access driver generates only one service request in a work session. In practice, a plurality of service requests may be generated and sent to RAPI 1550 between each work session.

In summary, the present invention requires the inclusion of a digital signature in session and service requests as a security measure to prevent components foreign to the system, such as viruses, to invoke BIOS functions or services. Furthermore, each successive session or service request includes a digital signature that is generated using a new private key to prevent foreign components from capturing and replaying the session and/or service requests and causing adverse effects to the system. Thus, the security measure employed in the present invention ensures safe and secured utilization of BIOS functions.

Although the present invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A system to securely utilize Basic Input and Output System (BIOS) services, comprising:

an access driver to generate a service request to utilize BIOS services, the service request including a service request signature created using a private key in a cryptographic key pair; and an interface to verify the service request signature using a public key in the cryptographic key pair to ensure the integrity of the service request.

2. The system of claim 1, wherein:

the access driver generates a session request to establish a session with the interface; and the session request includes a session request signature created using a private key in a cryptographic key pair.

3. The system of claim 1, wherein:

the access driver generates a session request to end the session with the interface; and the session request includes a session request signature created using a private key in a cryptographic key pair.

4. The system of claim 1, wherein:

the interface generates an authority certificate and send the authority certificate to the access driver after receiving a session request; and the access driver uses information included in the authority certificate to generate subsequent session requests.

5. The system of claim 4, wherein the authority certificate includes a new public key.

6. The system of claim 4, wherein the authority certificate includes a new private key.

7. The system of claim 4, wherein the authority certificate includes a certificate signature.

8. The system of claim 1, wherein:

the interface generates an authority certificate and sends the authority certificate to the access driver after receiving the service request; and the access driver uses information in the authority certificate to generate subsequent service requests.

9. A method to securely invoke Basic Input and Output System (BIOS) services, comprising:

creating a service request to invoke BIOS services;

signing the service request with a service request signature generated using a private key in a cryptographic key pair; and verifying the service request signature using a public key in the cryptographic key pair to ensure the integrity of the service request.

10. The method of claim 9, further comprising:

creating an authority certificate that includes a new private key and a new public key after processing the service request;

signing a subsequent service request with a service request signature generated using the new private key; and verifying the service request signature of the subsequent service request using the new public key.

11. The method of claim 9, further comprising:

performing a BIOS service indicated by a service operation code included in the service request.

12. The method of claim 9, further comprising:

creating a session request to establish a session with a ROM Application Program Interface (RAPI);

signing the session request with a session request signature generated using a private key in a cryptographic key pair; and verifying the session request signature using a public key in the cryptographic key pair to ensure the integrity of the session request.

13. The method of claim 12, further comprising:

creating an authority certificate that includes a new private key and a new public key after processing the session request;

signing a subsequent session request with a session request signature generated using the new private key; and verifying the session request signature of the subsequent session request using the new public key.

14. The method of claim 10, further comprising:

creating a session request to end a session with a ROM Application Program Interface (RAPI);

signing the session request with a session request signature generated using a private key in a cryptographic key pair; and verifying the session request signature using a public key in the cryptographic key pair to ensure the integrity of the session request.

15. A computer program embodied on a computer-readable medium to securely utilize Basic Input and Output System (BIOS) services, comprising:

an access driver to generate a service request to utilize BIOS services, the service request including a service request signature created using a private key in a cryptographic key pair; and an interface to verify the service request signature using a public key in the cryptographic key pair to ensure the integrity of the service request.

* * * * *